US012164242B2

(12) United States Patent
Ishii et al.

(10) Patent No.: US 12,164,242 B2
(45) **Date of Patent: *Dec. 10, 2024**

(54) DEVELOPING ROLLER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Toru Ishii, Shizuoka (JP); Kazuaki Nagaoka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,675

(22) Filed: Nov. 14, 2023

(65) Prior Publication Data

US 2024/0085821 A1 Mar. 14, 2024

Related U.S. Application Data

(63) Continuation of application No. 18/057,993, filed on Nov. 22, 2022, now Pat. No. 11,841,629.

(30) Foreign Application Priority Data

Nov. 25, 2021 (JP) ................................ 2021-191471

(51) Int. Cl.

| | |
|---|---|
| ***G03G 15/08*** | (2006.01) |
| ***G03G 15/02*** | (2006.01) |
| ***G03G 15/16*** | (2006.01) |

(52) U.S. Cl.

CPC ..... *G03G 15/0808* (2013.01); *G03G 15/0233* (2013.01); *G03G 15/0818* (2013.01); *G03G 15/1685* (2013.01)

(58) Field of Classification Search

None

See application file for complete search history.

(56) References Cited

U.S. PATENT DOCUMENTS

| | | | | |
|---|---|---|---|---|
| 11,841,629 | B2 * | 12/2023 | Ishii | G03G 15/1685 |
| 2020/0012210 | A1 * | 1/2020 | Imai | G03G 15/0818 |
| 2020/0064754 | A1 * | 2/2020 | Sano | G03G 15/1685 |
| 2020/0073309 | A1 * | 3/2020 | Matsunaga | G03G 15/0818 |
| 2020/0096898 | A1 * | 3/2020 | Utsuno | G03G 15/0818 |
| 2022/0308496 | A1 * | 9/2022 | Nagaoka | G03G 15/0808 |

* cited by examiner

*Primary Examiner* — Sevan A Aydin

(74) *Attorney, Agent, or Firm* — CANON U.S.A., INC. IP DIVISION

(57) ABSTRACT

A developing roller comprising an electroconductive substrate and an electroconductive elastic layer constituted by a single layer on an outer periphery of the substrate. The elastic layer contains a diene-based rubber, has a thickness of 0.30 mm or more, and the elastic layer has a crown shape in which an outer diameter of a center portion in a longitudinal direction along an axis of the substrate is larger than an outer diameter of each of both end portions in the longitudinal direction. Elastic moduli E11, E12 and E13 in a first region of the elastic layer in cross-sections at positions P1, P2 and P3 of the elastic layer are each 500 MPa or more.

13 Claims, 8 Drawing Sheets

200

DEVELOPING ROLLER, PROCESS CARTRIDGE, AND ELECTROPHOTOGRAPHIC IMAGE FORMING APPARATUS

CROSS-REFERENCE TO RELATED APPLICATIONS

This application is a continuation of U.S. patent application Ser. No. 18/057,993, filed Nov. 22, 2022, which claims the benefit of Japanese Patent Application No. 2021-01471, filed Nov. 25, 2021, each of which is hereby incorporated by reference herein in their entirety.

BACKGROUND

Technical Field

The present disclosure relates to a developing roller to be incorporated into an apparatus adopting an electrophotographic system. The present disclosure also relates to a process cartridge and an electrophotographic image forming apparatus each using the developing roller.

Description of the Related Art

In an electrophotographic image forming apparatus (sometimes referred to as "electrophotographic apparatus"), such as a copying machine, a facsimile machine, or a printer using an electrophotographic system, image formation is performed through the following steps: a step of charging the surface of an image-bearing member; a step of forming an electrostatic latent image on the surface of the image-bearing member by a laser or the like; a step of developing the electrostatic latent image with a toner; a step of transferring the developed toner image onto recording paper; and a step of fixing the transferred image on the recording paper with heat and a pressure. In addition, there is a cleaning step of removing the toner remaining on the image-bearing member after the transfer onto the recording paper with a cleaning blade.

The development of the electrostatic latent image with the toner is performed as described below. The toner in a developing container is applied onto the surface of a developing roller by a toner-suppling member and a toner-regulating member, and the developing roller is brought into contact with or close to the image-bearing member, with the result that the toner is attracted to the electrostatic latent image. As the developing roller, a developing roller including an electroconductive substrate and an elastic layer formed on an outer periphery of the electroconductive substrate is generally used. As the elastic layer, there are a configuration in which a plurality of layers are laminated and a configuration of a single layer.

A diene-based rubber having high impact resilience may be used for a single layer elastic layer. However, when the developing roller including the single layer elastic layer containing a diene-based rubber is brought into abutment with the image-bearing member, the developing roller may be bent due to the rubber elasticity of the elastic layer. As a result, the width of a nip in an axial direction (longitudinal direction) may become non-uniform. Such non-uniformity of the width of the nip in the axial direction may be solved by forming the elastic layer of the developing roller into such a shape (hereinafter referred to as "crown shape") that an outer diameter thereof in a center portion of the developing roller in the longitudinal direction is larger than that in each of end portions thereof as disclosed in Japanese Patent Application Laid-Open No. H04-336561.

However, as a result of investigations made by the inventors on the developing roller including the single layer elastic layer containing a diene-based rubber and having a crown shape, when such developing roller was used for forming an electrophotographic image on a large number of sheets, for example, 300,000 sheets, under a low-temperature and low-humidity environment, density unevenness occurred on the electrophotographic image in some cases.

SUMMARY

At least one aspect of the present disclosure is directed to providing a developing roller that contributes to the stable formation of an electrophotographic image of high quality even when used for forming the electrophotographic image for a long period of time under a low-temperature and low-humidity environment. In addition, at least one aspect of the present disclosure is directed to providing an electrophotographic process cartridge that contributes to the stable provision of an electrophotographic image of high quality for a long period of time. Further, at least one aspect of the present disclosure is directed to providing an electrophotographic image forming apparatus that can stably form an electrophotographic image of high quality for a long period of time.

According to at least one aspect of the present disclosure, there is provided a developing roller comprising: an electroconductive substrate, and an electroconductive elastic layer constituted by a single layer on an outer periphery of the substrate. The elastic layer contains a diene-based rubber, and has a thickness of 0.30 mm or more. The elastic layer has a crown shape in which an outer diameter of a center portion in a longitudinal direction along an axis of the substrate is larger than an outer diameter of each of both end portions in the longitudinal direction. E11, the E12, and the E13 are each 500 MPa or more, where E11, E12 and E13 are elastic moduli in a first region between an outer surface of the elastic layer and a point at a depth of 0.1 μm from the outer surface of the elastic layer in cross-sections at positions P1, P2 and P3 respectively, the positions P1, P2 and P3 being positions of (1/10)L, (1/2)L, and (9/10)L from one end to another end of the elastic layer in the longitudinal direction of the elastic layer, s here L is a length of the elastic layer in the longitudinal direction of the elastic layer.

In addition, according to at least one aspect of the present disclosure, there is provided a process cartridge, which is removably mounted onto a main body of an electrophotographic image forming apparatus, the process cartridge comprising the developing roller according to the one aspect.

Further, according to at least one aspect of the present disclosure, there is provided an electrophotographic image forming apparatus, comprising at least an image-bearing member, a charging device, a developing device, and a transferring device configured to transfer a formed image onto recording paper, the developing device including the developing roller according to the one aspect.

Further features of the present disclosure will become apparent from the following description of exemplary embodiments with reference to the attached drawings.

DESCRIPTION OF THE EMBODIMENTS

Figure 1A:
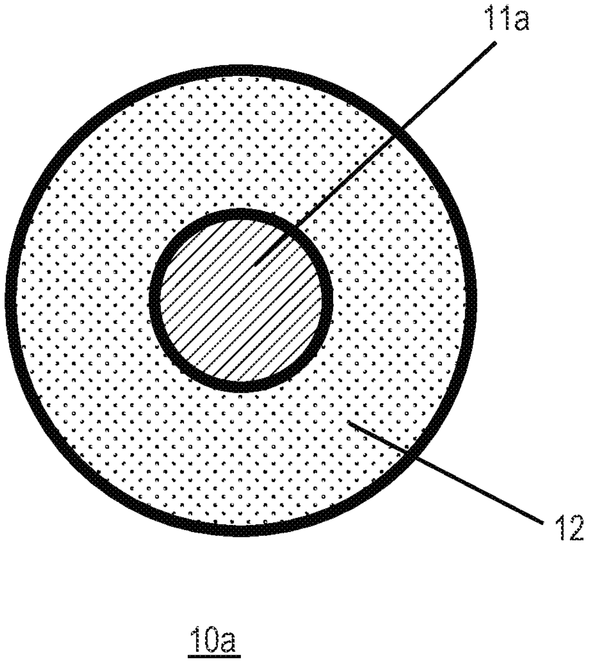
FIG. 1A is a schematic view of a developing roller according to one aspect of the present disclosure when viewed from a cross-sectional direction.

The inventors have repeatedly made investigations in order to find the cause for the occurrence of density unevenness on an electrophotographic image when a developing roller comprising a single layer elastic layer containing a diene-based rubber and having a crown shape is used for a long period of time under a low-temperature and low-humidity environment. In this process, the inventors have found that the electric resistance measured on the surface of the developing roller when an electrophotographic image having density unevenness is formed varies in an axial direction thereof. From this finding, the inventors have presumed that the phenomenon in which the electric resistance varies in the axial direction is caused by the crown shape. That is, in the elastic layer having the crown shape, the compression amount of the elastic layer in a nip portion varies in an axial direction thereof. Specifically, for example, the compression amount in a center portion in the axial direction is larger than that in each of end portions. The electric resistance of the elastic layer in the nip portion varies due to such difference in compression amount. As a result, a difference in energization amount is caused in the axial direction of the elastic layer. Then, due to the long-term use, the difference in amount of an electric current flowing through the diene-based rubber is gradually increased in the axial direction of the elastic layer, and along with this, the degree of alteration of the diene-based rubber comes to vary in the axial direction. It is conceived that, as a result of the foregoing, the electric resistance of the elastic layer varies in the axial direction.

The inventors have made further investigations in order to solve the above-mentioned disadvantage caused by the presence of the crown shape in the electroconductive elastic layer. As a result, the inventors have found that the prevention of a region in the immediate vicinity of the surface of the elastic layer, specifically, a region between the outer surface and a position at a depth of 0.1 μm from the outer surface from being easily strained even in the nip portion contributes to the solution of the above-mentioned disadvantage.

Specifically, the thickness of the elastic layer is set to 0.30 mm or more, and when the length of the elastic layer in a longitudinal direction is represented by L; positions of (1/10)L, (1/2)L, and (9/10)L, from one end to another end of the elastic layer in the longitudinal direction are represented by P1, P2, and P3, respectively; and in cross-sections of the elastic layer in the thickness direction at the respective positions P1, P2, and P3, elastic moduli in a first region between the outer surface of the elastic layer and a position at a depth of 0.1 μm from the outer surface of the elastic layer are represented by E11, E12, and E13, respectively, the E11, the E12, and the E13 are each 500 MPa or more. It has been found that a developing roller including such elastic layer is less liable to cause density unevenness on an electrophotographic image even when used for forming the electrophotographic image for a long period of time under a low-temperature and low-humidity environment.

<Developing Roller>

Figure 1B:
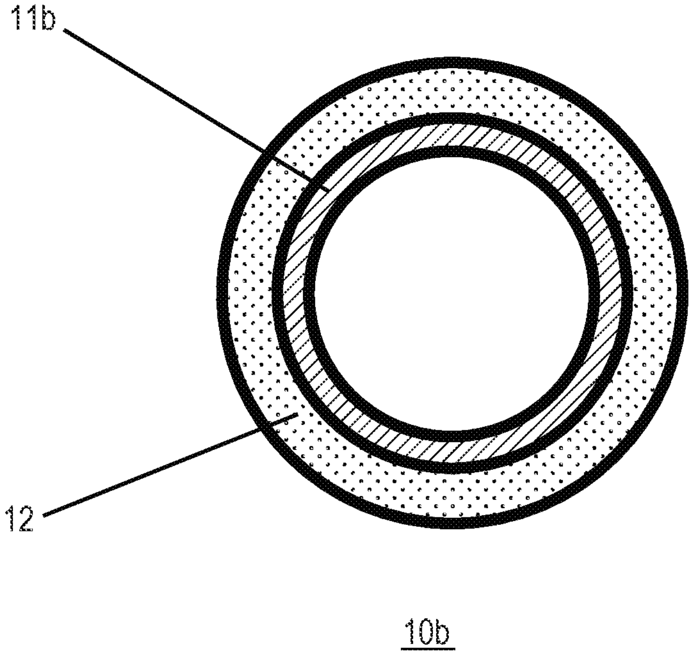
FIG. 1B is a schematic view of a developing roller according to one aspect of the present disclosure when viewed from a cross-sectional direction.

Schematic cross-sectional views of a developing roller 10 according to one aspect of the present disclosure are illustrated in FIG. 1A and FIG. 1B, but the shape of the developing roller is not limited thereto.

FIG. 1A is a circumferential cross-sectional view of a developing roller 10*a* including a solid electroconductive substrate 11*a* and an elastic layer 12 formed on an outer periphery of the substrate 11*a*. FIG. 1B is a circumferential cross-sectional view of a developing roller 10*b* including a hollow cylindrical electroconductive substrate 11*b* and the elastic layer 12 formed on an outer periphery of the substrate 11*b*. The hollow cylindrical substrate 11*b* is reduced in weight because of a hollow portion, and is suitable for a developing roller having a larger outer diameter. In the following, the developing roller and the electroconductive substrate are described with reference symbols 10 and 11, respectively.

[Electroconductive Substrate]

A columnar or hollow cylindrical electroconductive mandrel, or a product obtained by further forming an electroconductive intermediate layer as a single layer or a plurality of layers on an outer periphery of such mandrel may be used as the electroconductive substrate 11 (11*a*, 11*b*).

The shape of the mandrel is a columnar shape or a hollow cylindrical shape, and the mandrel includes any one of the following electroconductive materials: a metal or an alloy, such as aluminum, a copper alloy, or stainless steel; iron subjected to plating treatment with chromium or nickel; and a synthetic resin having electroconductivity. A known adhesive may be appropriately applied to the surface of the mandrel for the purpose of improving its adhesive property with, for example, the intermediate layer or the surface layer on the outer periphery of the mandrel.

[Elastic Layer]

The elastic layer 12 contains a diene-based rubber and is constituted by a single layer on the outer periphery of the electroconductive substrate 11. Examples of the diene-based rubber include a natural rubber, an isoprene rubber (IR), an acrylonitrile-butadiene rubber (NBR), a styrene-butadiene, rubber (SBR), a butadiene rubber (BR), a chloroprene rubber (CR), and modified products of those rubbers. Those rubbers may be used alone or as a mixture thereof.

Of the above-mentioned diene rubbers, NBR may be particularly suitably used because of the satisfactory mechanical strength and impact resilience thereof. The characteristics of NBR may be adjusted by the amount of acrylonitrile (AN amount), and NBR may be appropriately selected to be used. Specifically, when the AN amount is larger, the mechanical strength becomes more excellent, but the hardness of the rubber is also increased. When the AN amount becomes too large, the stability of nip formation with respect to an abutment member tends to be decreased. Accordingly, it is preferred to select NBR having an AN amount of a certain level or less. Meanwhile, when the AN amount becomes too small, the characteristics of NBR are brought close to those of a butadiene rubber, and hence the polarity of the material tends to be decreased. Further, in this case, the impregnability of a treatment liquid in surface treatment described later is lowered. Accordingly, the AN amount of NBR falls preferably within a range of 10 mass % or more and 50 mass % or less, more preferably within a range of 15 mass % or more and 42 mass % or less. When the AN amount of NBR falls within the above-mentioned ranges, NBR is excellent in balance between the mechanical strength and the flexibility and has an appropriate polarity, and hence in the surface treatment described later, the impregnability of the treatment liquid can be appropriately controlled.

In addition, a rubber other than the diene-based rubber may be mixed in the elastic layer 12 to the extent that the effects of the present disclosure are not lost.

Various additives, such as resin particles, an electroconductive agent, a plasticizer, a filler, an extender, a crosslinking agent, a crosslinking accelerator, a vulcanization aid, a crosslinking aid, an acid acceptor, a curing inhibitor, an antioxidant, and an age inhibitor, may each be further incorporated into the elastic layer 12 as required. Those additives may each be blended in an amount in such a range that the features of the present disclosure are not impaired.

In order to be used as a developing roller, the elastic layer 12 has electroconductivity capable of receiving an electric potential from the electroconductive substrate 11 and carrying a toner on the surface thereof. The volume resistivity of the elastic layer 12 is adjusted to preferably $10^3$ Ωcm or more and $10^{11}$ Ωcm or less, more preferably $10^4$ Ωcm or more and $10^{10}$ Ωcm or less.

As a method of imparting electroconductivity to the elastic layer, an electroconductivity-imparting agent (electroconductive agent), such as an electronic electroconductive substance or an ionic electroconductive substance, may be blended. Examples of the electronic electroconductive substance include the following substances: electroconductive carbons, including carbon blacks, such as ketjen black EC and acetylene black; carbons for rubbers, such as super abrasion furnace (SAF), intermediate SAP (ISAF), high abrasion furnace (HAP), fast extruding furnace (PEP), general purpose furnace (GPF), semi-reinforcing furnace (SRF), fine thermal (FT), and medium thermal (MT); carbons for colors (inks) each subjected to oxidation treatment; metals, such as copper, silver, and germanium, and metal oxides thereof. Of those, electroconductive carbons are preferred because the carbons each easily control the electroconductivity even when used in a small amount. Examples of the ionic electroconductive substance include the following substances: inorganic ionic electroconductive substances, such as sodium perchlorate, lithium perchlorate, calcium perchlorate, and lithium chloride and organic ionic electroconductive substances, such as a modified aliphatic dimethylammonium ethosulfate and stearylammonium acetate.

A sulfur-based crosslinking agent (vulcanizing agent) may be used as the crosslinking agent. Examples of the vulcanizing agent include sulfurs, such as powdered sulfur, oil-treated powdered sulfur, precipitated sulfur, colloidal sulfur, and dispersible sulfur, and organic sulfur-containing compounds, such as tetramethylthiuram disulfide and N,N-dithiobismorpholine.

The proportion of the vulcanizing agent is preferably 0.5 part by mass or more and 2.0 parts by mass or less with respect to 100 parts by mass of the total amount of the rubber in terms of sulfur in consideration of imparting of satisfactory characteristics as the rubber. In addition, also when the organic sulfur-containing compound is used as the crosslinking agent, the proportion thereof is preferably adjusted so that the amount of sulfur in the molecule falls within the above-mentioned range.

Examples of the crosslinking accelerator for accelerating the crosslinking include a thiuram-based accelerator, a thiazole-based accelerator, a thiourea-based accelerator, a guanidine-based accelerator, a sulfenamide-based accelerator, and a dithiocarbamate-based accelerator.

Examples of the crosslinking aid include known crosslinking aids, including: metal compounds such as zinc oxide and fatty acids, such as stearic acid and oleic acid.

The proportion of the crosslinking aid is preferably 0.1 part by mass or more and 7.0 parts by mass or less with respect to 100 parts by mass of the total amount of the rubber.

Various substances each acting as an acid receptor may be used as the acid acceptor, and hydrotalcite, which is excellent in dispersibility, is particularly preferably used.

As the filler, there may be used, for example, silica, carbon black, talc, calcium carbonate, magnesium carbonate, or aluminum hydroxide.

When those fillers are blended, the mechanical strength of the resin can be expected to be improved. In addition, through use of electroconductive carbon black, which functions as an electronic electroconductive agent, as the filler, electron conductivity can also be imparted to the elastic layer together with the effect as the filler.

The thickness of the elastic layer 12 may be appropriately adjusted as required. The elastic layer 12 may have a region having an elastic modulus of 500 MPa or more in the immediate vicinity of the surface at 0.1 μm from the surface, and the thickness is set to 0.30 mm or more so that the nip width in the axial direction can be made uniform. The upper limit is not particularly limited, but the upper limit is, for example, 3.00 mm or less. Accordingly, the thickness of the elastic layer is preferably 0.30 mm or more and 3.00 mm or less, particularly preferably 0.50 mm or more and 3.00 mm or less.

The elastic layer 12 has a crown shape in which the outer diameter of a center portion in the longitudinal direction along the axis of the substrate is larger than the outer diameter of each of both end portions in the longitudinal direction. The difference between the outer diameter of the center portion of the elastic layer 12 and the outer diameter of each of both the end portions is defined as a crown amount. The crown amount is not particularly limited, and may be appropriately set in a range in which the nip with the abutment member can be stably formed. For example, in order to make the abutment width more uniform, the crown amount is preferably 1% or more and 30% or less, more preferably 3% or more and 25% or less with respect to the thickness of the elastic layer in the center portion.

When the crown amount is insufficient, an abutment nip with an image-bearing member cannot be appropriately formed in the vicinity of the center of a developing roller in the longitudinal direction due to deflection caused when the developing roller is brought into abutment with another member while the end portion is held, with the result that development is not appropriately performed. Because of this, the center portion of an image has blank dots as an output image, Meanwhile, when the crown amount is too large, the abutment nip cannot be appropriately formed in the vicinity of each of the end portions of the developing roller, with the result that each of the end portions of the image has blank dots. Accordingly, when the center portion of the image has blank dots, it is only required that the crown amount be increased. When each of the end portions of the image has blank dots, it is only required that the crown amount be decreased.

In addition, when the overall macroscopic hardness of the elastic layer 12 is high, such high hardness is disadvantageous for forming a nip, and blank dots are liable to occur. Macroscopic hardness may be recognized by, for example, a durometer hardness test. Accordingly, in order to suppress blank dots, it is only required that the durometer hardness of the elastic layer 12 be designed to be low in an appropriate range. For example, it is preferred that the type A durometer hardness be 90 or less.

The crown shape may be formed by, for example, a traverse grinding method or a plunge-cut grinding method in which a grinding stone wider than the length of the developing roller 10 is caused to cut in without reciprocating while rotating around the axis of the substrate 11. Of those, a plunge-cut grinding method is preferred for the following reason. The plunge-cut grinding method has an advantage of being able to grind the full width of the elastic layer 12 in the longitudinal direction at a time, and is suitable for continuous production because the processing time is shortened,

[Surface Treatment]

Figure 2:
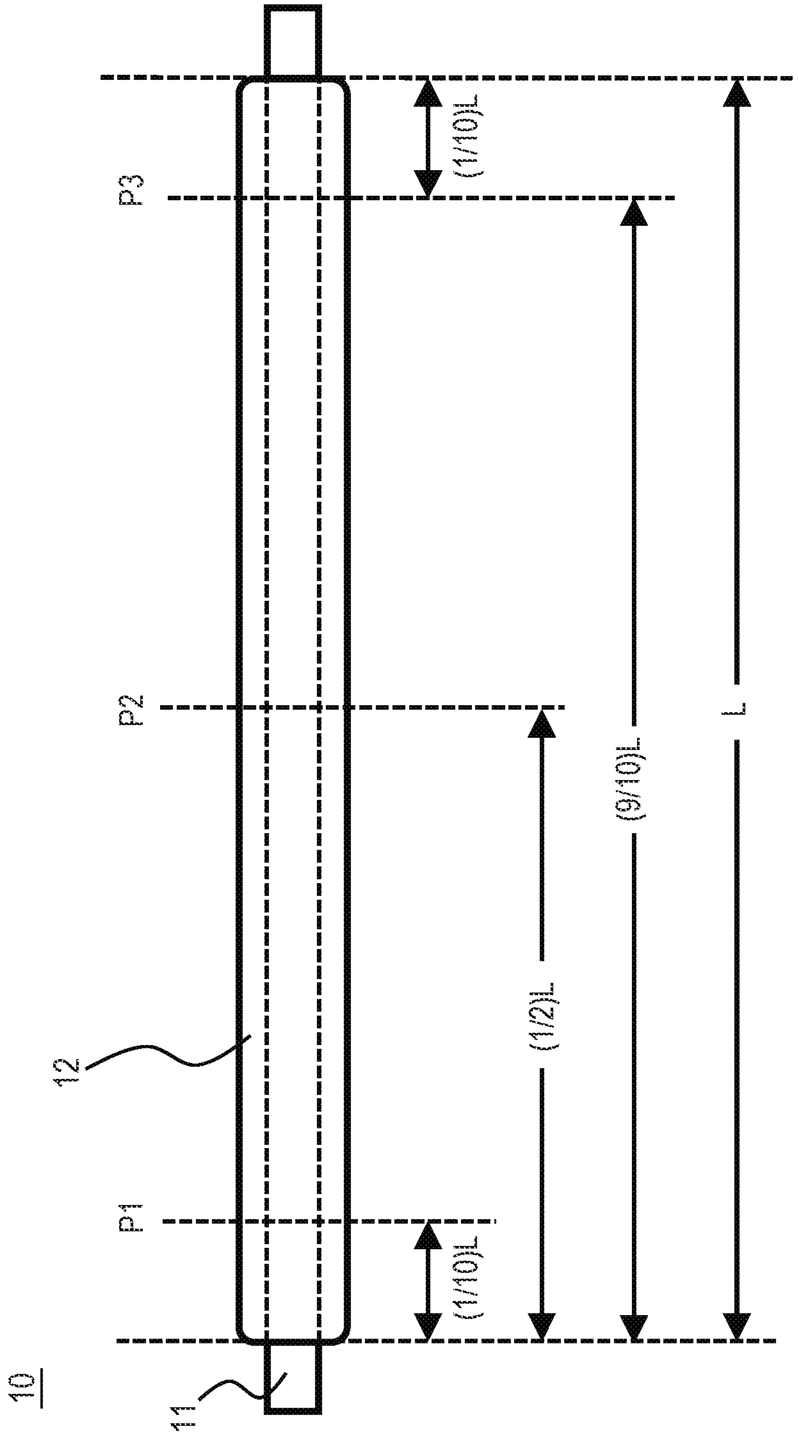
FIG. 2 is a schematic view for illustrating the developing roller according to one aspect of the present disclosure.
Figure 3:
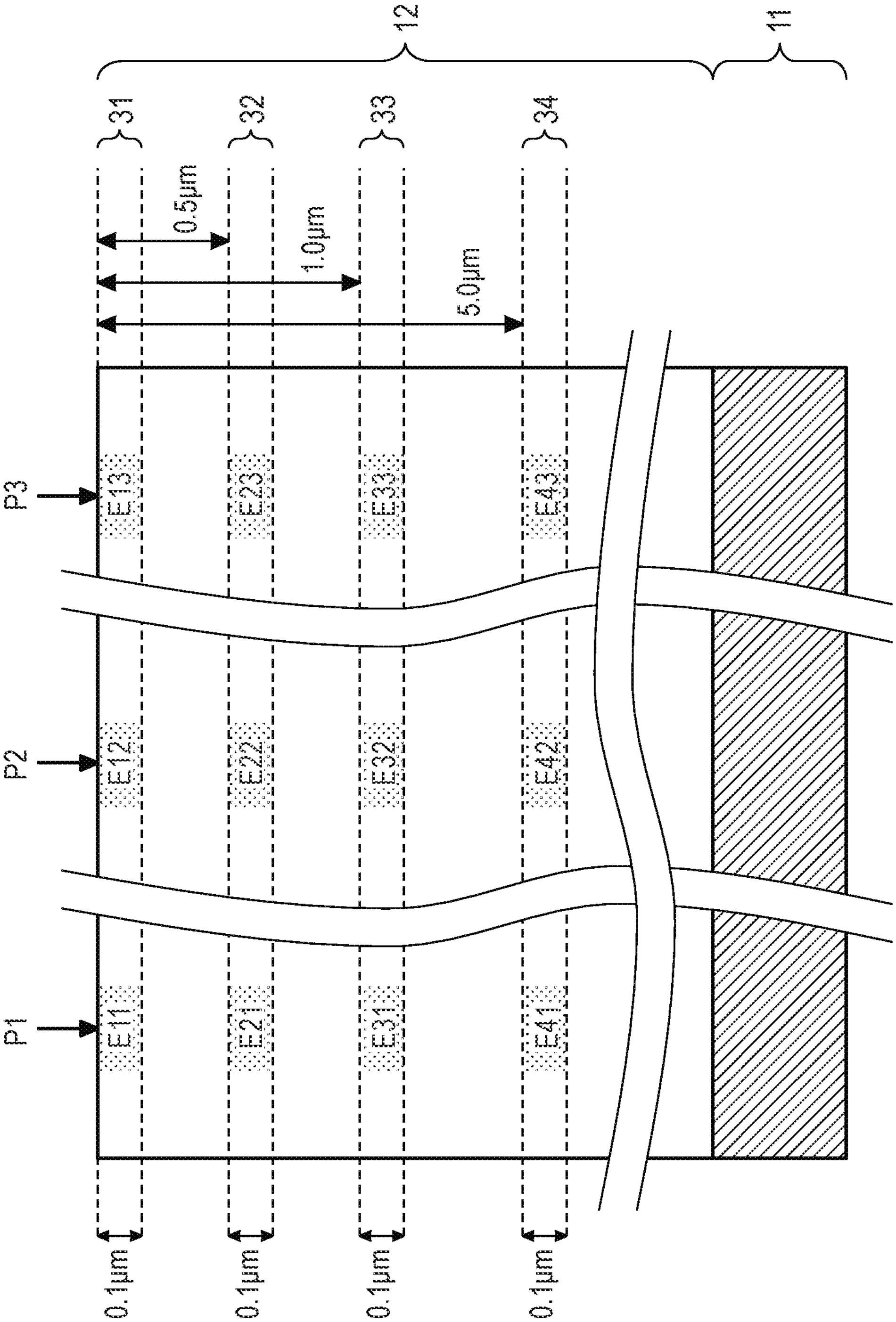
FIG. 3 is a schematic sectional view for illustrating measurement positions of elastic moduli of an elastic layer of the developing roller according to one aspect of the present disclosure.

As illustrated in FIG. 2, in the developing roller 10, the total length of the elastic layer 12 in the longitudinal direction is represented by L, and positions of (1/10)L, (1/2)L, and (9/10)L from one end to another end of the elastic layer 12 in the longitudinal direction are represented by P1, P2, and P3, respectively. The position P2 corresponds to the center of the electroconductive layer in the longitudinal direction. As illustrated in FIG. 3, in cross-sections of the elastic layer 12 in a thickness direction at the respective positions P1, P2, and P3, elastic moduli in a first region 31 between an outer surface of the elastic layer 12 and a position at a depth of 0.1 μm from the outer surface of the elastic layer are represented by E11, E12, and E13, respectively. In this case, in the developing roller 10 of the present disclosure, the E11, the E12, and the E13 are each 500 MPa or more. In order to achieve the elastic moduli in the above-mentioned range, a surface treatment method is selected to perform treatment. As a general method for surface treatment, there are given methods, such as UV treatment and electron beam treatment. Of those methods, in particular, a method involving preferentially increasing the elastic moduli in the vicinity of the outermost surface of the elastic layer 12 of the developing roller 10 is selected. For example, a treatment method involving impregnating the surface of the elastic layer 12 with a treatment liquid containing a polymerizable monomer and a polymerization initiator and polymerizing the resultant by UV irradiation can preferentially increase the elastic moduli in the vicinity of the outermost surface of the elastic layer 12. Further, this method is preferred because the elastic moduli and the depth at which the elastic moduli are increased can be controlled.

[Treatment Liquid]

The treatment liquid contains a polymerizable monomer, a polymerization initiator, and a solvent as required. An acrylic monomer is preferred as the polymerizable monomer. The kind of the acrylic monomer is not particularly limited as long as the acrylic monomer has one or more acryloyl groups or methacryloyl groups in one molecule. In particular, an acrylic monomer having one or two acryloyl groups or methacryloyl groups in one molecule is preferred because such acrylic monomer easily permeates the network structure of the diene-based rubber in the elastic layer and can effectively modify the outermost surface of the elastic layer of the developing roller. In addition, the acrylic monomers may be used as a mixture thereof.

The molecular weight of the acrylic monomer preferably falls within a range of 200 or more and 750 or less. Through use of a monomer having a molecular weight in the above-mentioned range, when the surface of the elastic layer is subjected to impregnation treatment, the monomer satisfactorily penetrates gaps in the network structure of the diene-based rubber and can effectively improve the elastic modulus and hardness of the surface of the elastic layer.

As described above, the acrylic monomer is impregnated into the elastic layer containing the diene-based rubber. To that end, the acrylic monomer is required to have an appropriate viscosity. That is, when the monomer has a high viscosity, the monomer is hardly impregnated, and when the monomer has a low viscosity, its impregnated state is difficult to control. Accordingly, the viscosity of the acrylic monomer is preferably 5.0 mPa·s or more and 140 mPa·s or less at 25° C.

A method of polymerizing the acrylic monomer is not particularly limited, and a known method may be used. Specific examples thereof include methods such as UV irradiation. A known radical polymerization initiator or ionic polymerization initiator may be used as the polymerization initiator for each of the polymerization methods.

A photopolymerization initiator when photopolymerization is performed by UV irradiation is, for example, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, or 2,4,6-trimethylbenzoyl-diphenylphosphine oxide. Those photopolymerization initiators may be used alone or in combination thereof.

In addition, with regard to the blending amount of the polymerization initiator, when the total amount of the acrylic monomer is defined as 100 parts by mass, the initiator is preferably used in an amount of 0.5 part by mass or more and 10 parts by mass or less from the viewpoint of efficiently advancing a reaction.

In addition, it is preferred that a solvent be blended with the treatment liquid. When the solvent is blended, the surface of the elastic layer of the developing roller can be easily impregnated with the acrylic monomer and the polymerization initiator. The solvent is not particularly limited, but an organic solvent capable of causing the diene-based rubber used in the elastic layer to swell and capable of dissolving the acrylic monomer and the polymerization initiator in the treatment liquid is preferred. Solvents each having satisfactory compatibility with another material selected from, for example: alcohols, such as methanol, ethanol, and n-propanol; ketones, such as acetone, methyl ethyl ketone, and methyl isobutyl ketone; and esters, such as methyl acetate and ethyl acetate, may be used alone or as a mixture thereof.

The surface of the elastic layer is subjected to impregnation treatment with the treatment liquid prepared by mixing the above-mentioned materials. An impregnation method for the treatment liquid is not particularly limited, but any one of dip coating, ring coating, spray coating, and roll coating may be used.

After the impregnation treatment is performed, the acrylic monomer is polymerized and cured. However, when the solvent that has swelled due to the impregnation treatment remains in the elastic layer, the curing reaction may not easily proceed. Accordingly, it is preferred to perform drying in order to remove the residual solvent before performing the curing reaction. The solvent that has infiltrated the elastic layer is captured by the network structure of the rubber, and the molecular movement thereof is restricted. For this reason, the solvent is not easily volatilized by air drying under a normal-temperature environment and is liable to remain in the elastic layer. Accordingly, as a drying method, a method by heating is preferred. In particular, it is preferred to perform drying at a temperature equal to or more than the boiling point of the solvent contained in the treatment liquid.

After the solvent is removed by drying, the outermost surface of the elastic layer can be increased in hardness by polymerizing and curing the acrylic monomer. A method for the polymerization and curing is not particularly limited, and a known method may be used. Specific examples thereof include methods, such as heat curing and UV irradiation. In particular, UV irradiation is preferred because the outermost surface side can be preferentially treated.

A known device may be appropriately used as a device for UV irradiation. For example, an LED lamp, a high-pressure mercury lamp, a metal halide lamp, a xenon lamp, and a low-pressure mercury lamp may each be used as a light source for applying UV light. The irradiation conditions for UV light at the time of polymerization may be appropriately adjusted in accordance with the kinds and addition amounts of the materials to be used. However, when the irradiation amount of UV light is insufficient, the curing reaction is insufficient, and a sufficient elastic modulus cannot be imparted to the outermost surface (first region) of the elastic layer.

As an indicator for UV treatment, an integrated light quantity may be used. The integrated light quantity is represented by the following formula: integrated light quantity (mJ)=illuminance (mW)×time (s). When the integrated light quantity is increased, the treatment strength is increased. Although depending on the reaction rate of the materials to be used, the integrated light quantity is preferably 15,000 mJ or more, particularly preferably 30,000 mJ or more.

In addition, curing by UV treatment is preferred for the following reason. When the curing by UV treatment is performed, the reaction rate of the curing reaction on the surface of the elastic layer is increased by keeping the surface temperature of the elastic layer of the developing roller to be treated at a certain level or more, and hence the elastic modulus of the outermost surface of the elastic layer can be effectively increased. Specifically, it is preferred to start the irradiation under a state in which the surface temperature of the elastic layer is 50° C. or more. Examples of a method of controlling the surface temperature include a method involving adjusting the temperature in a device for performing the UV treatment and a method involving performing preheating by workpiece heating before performing the UV treatment.

Through the impregnation and curing treatment described above, the elastic moduli E11, E12, and E13 at the positions P1, P2, and P3 in the first region 31 illustrated in FIG. 3 can be set to 500 MPa or more. As the elastic modulus in the first region 31 on the outermost surface, elastic moduli at the above-mentioned three points to be measured are mentioned, but the elastic modulus is substantially 500 MPa or more over the entire first region 31. Thus, through an increase in hardness of the outermost surface of the elastic layer, even when durable printing on 300,000 sheets or more is performed under a low-temperature and low-humidity environment, density unevenness in association with resistance unevenness can be suppressed.

The inventors have presumed as described below regarding whether the developing roller according to the present disclosure can suppress density unevenness in association with resistance unevenness even when durable printing is performed under a low-temperature and low-humidity environment.

First, the mechanism by which resistance unevenness occurs on the surface of the developing roller is described.

In a process of forming an image in an electrophotographic image forming apparatus, due to a potential difference between the elastic layer of the developing roller and another member that is brought into contact therewith, for example, an image-bearing member, an electric current is generated from the surface of the elastic layer of the developing roller between the elastic layer and another member that is brought into contact with the elastic layer.

Due to the generation of an electric current, the diene-based rubber of the elastic layer of the developing roller deteriorates, resulting in an increase in resistance. The term "deterioration" as used herein refers to an increase in resistance based on the oxidation of residual double bonds in the diene-based rubber by energization.

The amount of an increase in resistance is correlated with the amount of an electric current that has flowed, and the resistance tends to be increased when the amount of an electric current is larger. Accordingly, when an image is printed on an extremely large number of sheets, the integrated amount of an electric current flowing through the developing roller is also increased, and hence the resistance of the surface of the elastic layer tends to be increased. That is, when there is a difference in amount of an electric current that flows, a difference is caused in increase in resistance caused by the deterioration of the rubber, leading to resistance unevenness.

In an electroconductive rubber, the apparent resistance value fluctuates due to strain. Specifically, in the case where the rubber is strained by compression, when the strain is larger, the apparent resistance value is decreased. A developing roller having a single layer of a diene-based rubber has hitherto been generally formed into a crown shape in which the thickness of an elastic layer is set to be thicker in a center portion than in each of end portions of the roller in order to make the nip width with an image-bearing member uniform in the longitudinal direction.

When a developing roller having a crown shape is brought into abutment with an image-bearing member to form a nip having a uniform width, a difference in amount of strain of an elastic layer is caused depending on the position of the developing roller in the longitudinal direction. The elastic layer having different outer diameters in the longitudinal direction is compressed until the nip width becomes the same, and hence the amount of strain, which is the amount of deformation with respect to the original rubber thickness, varies depending on the position of the developing roller in the longitudinal direction.

As described above, the apparent resistance of the electroconductive rubber fluctuates depending on the amount of strain. Accordingly, when the developing roller having a crown shape is brought into abutment with the image-bearing member to form a uniform nip width in the longitudinal direction, the local resistance value also has unevenness in the longitudinal direction in association with the unevenness of the amount of strain that occurs in the longitudinal direction. As a result, due to the unevenness of the local resistance in the longitudinal direction, a difference in amount of an electric current that locally flows is also caused depending on the position in the longitudinal direction.

In addition, when there is a difference in amount of an electric current, as described above, a difference is caused also in amount of an increase in resistance caused by the deterioration of the rubber. Through such mechanism, resistance unevenness occurs in the longitudinal direction on the outermost surface of the elastic layer of the developing roller. When the outermost surface of the elastic layer has resistance unevenness, and there is a locally high-resistance portion, electric charge is accumulated in the high-resistance portion due to bias application in a development process. As a result, a difference is caused in apparent potential between the high-resistance portion and the low-resistance portion. In general, in an electrophotographic development process, a developing bias is applied in order to move a developer from the developing roller toward the image-bearing member. As described above, when a difference is caused in apparent potential between the high-resistance portion and the low-resistance portion, the apparent developing bias also varies in association therewith, resulting in a difference in amount of a developer to be developed. It is conceived that the foregoing appears as density unevenness at the time of image printing.

In the limited number of printing sheets as in the past, the total amount of an electric current is small and the resultant resistance unevenness is small, and hence an image defect such as density unevenness has not been caused. However, in the printing on an extremely large number of sheets, which may be required in future products, the width of resistance unevenness is also increased due to an increase in total amount of an electric current.

Further, under a low-temperature and low-humidity environment, as compared to a high-temperature and high-humidity environment or the like, electric charge tends to be accumulated in the high-resistance portion, and hence it is conceived that density unevenness in a printed image also prominently appears.

Specifically, it is conceived that this phenomenon of density unevenness is a phenomenon that occurs only when the developing roller of a diene-based rubber having a crown shape is used under a low-temperature and low-humidity environment to print an image on an extremely large number of sheets, which has not hitherto been expected, and the total amount of an electric current is increased.

Next, the thoughts of the inventors on the reason why the developing roller of the present disclosure can suppress the occurrence of image density unevenness caused by resistance unevenness as described above are described below.

In the developing roller of the present disclosure, the elastic modulus in the first region 31, which is the outermost surface of the elastic layer 12, is 500 MPa or more at any of the positions P1, P2 and P3 in FIG. 3. With this elastic modulus, in the vicinity of the outermost surface of the elastic layer 12, strain in association with the nip formation is suppressed, and strain unevenness in the longitudinal direction is also suppressed. As a result, the variation in apparent resistance in association with stain unevenness described above is suppressed on the outermost surface of the elastic layer 12, and the resistance can be made uniform. For this reason, unevenness in the amount of a local electric current on the outermost surface of the elastic layer 12 depending on the position in the longitudinal direction can be suppressed. Accordingly, it is conceived that unevenness in the width of an increase in resistance in association with the deterioration of the diene-based rubber caused by energization is also suppressed, and hence density unevenness when an image is printed on a large number of sheets can be suppressed.

Further, in the developing roller of the present disclosure, as illustrated in FIG. 3, in the cross-sections in the thickness direction at the respective positions P1, P2, and P3, the elastic moduli in a second region 32 between a point at a depth of 0.5 μm from the outer surface of the elastic layer and a point at a depth of 0.6 μm from the outer surface of the elastic layer are represented by E21, E22, and E23, respectively. Further, the elastic moduli in a third region 33 between a point at a depth of 1.0 μm from the outer surface of the elastic layer and a point at a depth of 1.1 μm from the outer surface of the elastic layer are represented by E31, E32, and E33, respectively. In this case, it is preferred that the E11, the E12, the E13, the E21, the E22, the E23, the E31, the E32, and the E33 satisfy the following formulae (1) to (3):

$$E11 \geq E21 \geq E31 \quad (1);$$

$$E12 \geq E22 \geq E32 \quad (2); \text{ and}$$

$$E13 \geq E23 \geq E33 \quad (3).$$

Further, it is more preferred that the following formulae (1') to (3') be satisfied:

$$E11 < E21 < E31 \quad (1');$$

$$E12 < E22 < E32 \quad (2'); \text{ and}$$

$$E13 < E23 < E33 \quad (3').$$

As in the above-mentioned formulae, when the elastic modulus is decreased with an increase in depth from the surface of the elastic layer 12 in the longitudinal direction of the developing roller 10, the inside of the elastic layer 12 is preferentially strained at the time of nip formation. For this reason, strain on the outermost surface of the elastic layer 12 is relatively reduced. As a result, the elastic modulus inside the elastic layer 12 is highly effective for suppressing density unevenness caused by resistance unevenness.

In addition, in the developing roller 10 of the present disclosure, as illustrated in FIG. 3, in the cross-sections in the thickness direction at the respective positions P1, P2, and P3, a region between a point at a depth of 5.0 μm from the outer surface of the elastic layer and a point at a depth of 5.1 μm from the outer surface of the elastic layer is defined as a fourth region 34. When the elastic moduli in the fourth region 34 at the positions P1, P2, and P3 are represented by E41, E42, and E43, respectively, it is preferred that the E41, the E42, and the E43 be each 100 MPa or less. When the elastic moduli are equal to or less than the above-mentioned range, the inside of the elastic layer is preferentially strained at the time of nip formation, and hence the strain of the outermost surface of the elastic layer is suppressed. Because of this, the relationship of the elastic moduli is highly effective for suppressing density unevenness caused by resistance unevenness.

As described above, the higher macroscopic hardness of the entire elastic layer is more disadvantageous for nip formation. For this reason, when the outermost surface of the elastic layer is increased in hardness, it is preferred to minimize the influence on the macroscopic hardness. For this purpose, it is preferred that only the region close to the outermost surface be preferentially increased in hardness. That is, it is preferred that the E11, E31, and E41, the E12, E32, and E42, and the E13, E33, and E43 satisfy the following formulae (4) to (6). As a result, both the securement of a satisfactory nip and the suppression of density unevenness caused by resistance unevenness can be achieved at a high level:

$$(E31-E11)/(E41-E11)\geq 0.50 \quad (4);$$

$$(E32-E12)/(E42-E12)\geq 0.50 \quad (5); \text{ and}$$

$$(E33-E13)/(E43-E13)\geq 0.50 \quad (6).$$

<Process Cartridge>

A process cartridge according to one aspect of the present disclosure includes at least a developing device, and the developing device includes the developing roller according to the present disclosure. The process cartridge is supported by a housing (not shown) and is removably mounted onto an electrophotographic image forming apparatus.

Figure 4:
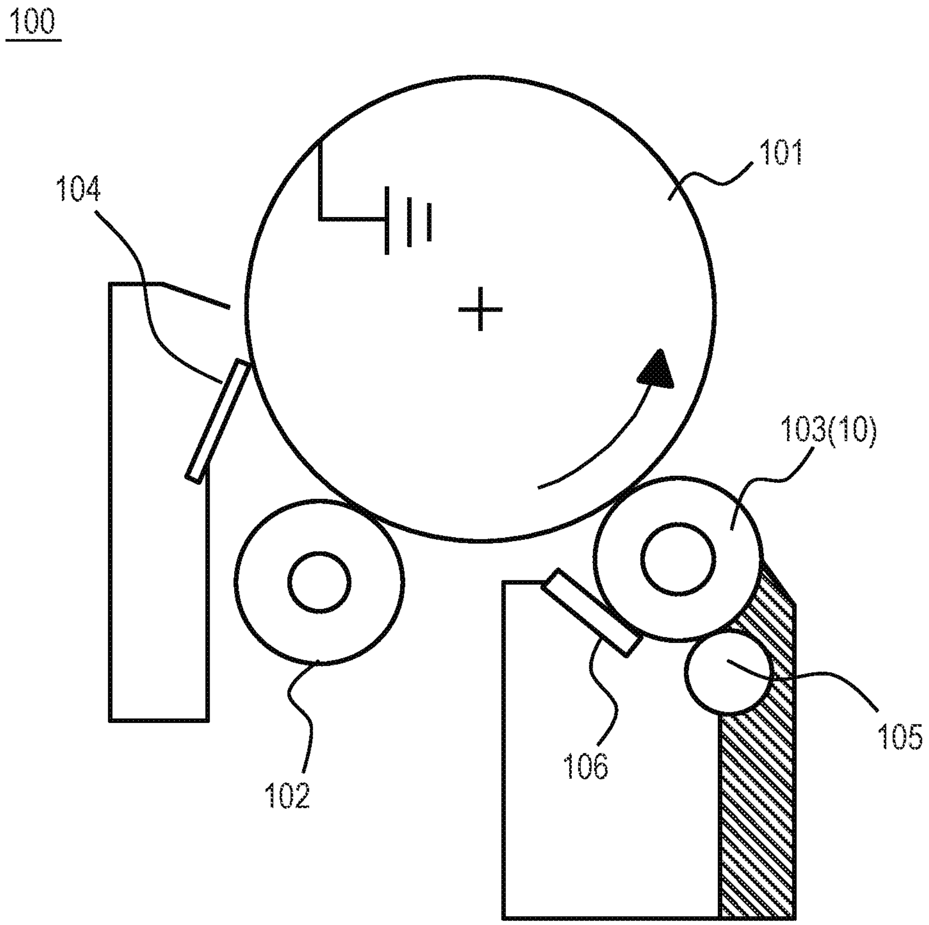
FIG. 4 is a schematic view for illustrating an electrophotographic process cartridge according to one aspect of the present disclosure.

A process cartridge 100 according to one embodiment of the present disclosure is illustrated in FIG. 4. The process cartridge 100 includes an image-bearing member (photosensitive member) 101, a charging member (charging roller) 102, and a developing member 103 (developing roller 10). In addition, a toner-supplying member 105 and a toner-regulating member 106, which are brought into abutment with the developing member 103 as a developing unit, are incorporated into the process cartridge 100. Further, a cleaning member (cleaning blade) 104 is arranged upstream of the charging member 102.

<Electrophotographic Image Forming Apparatus>

An electrophotographic image forming apparatus according to one aspect of the present disclosure includes at least an image-bearing member, a charging device, a developing device, and a transferring device that transfers a formed image onto recording paper, and the developing device includes a developing roller according to the present disclosure.

Figure 5:
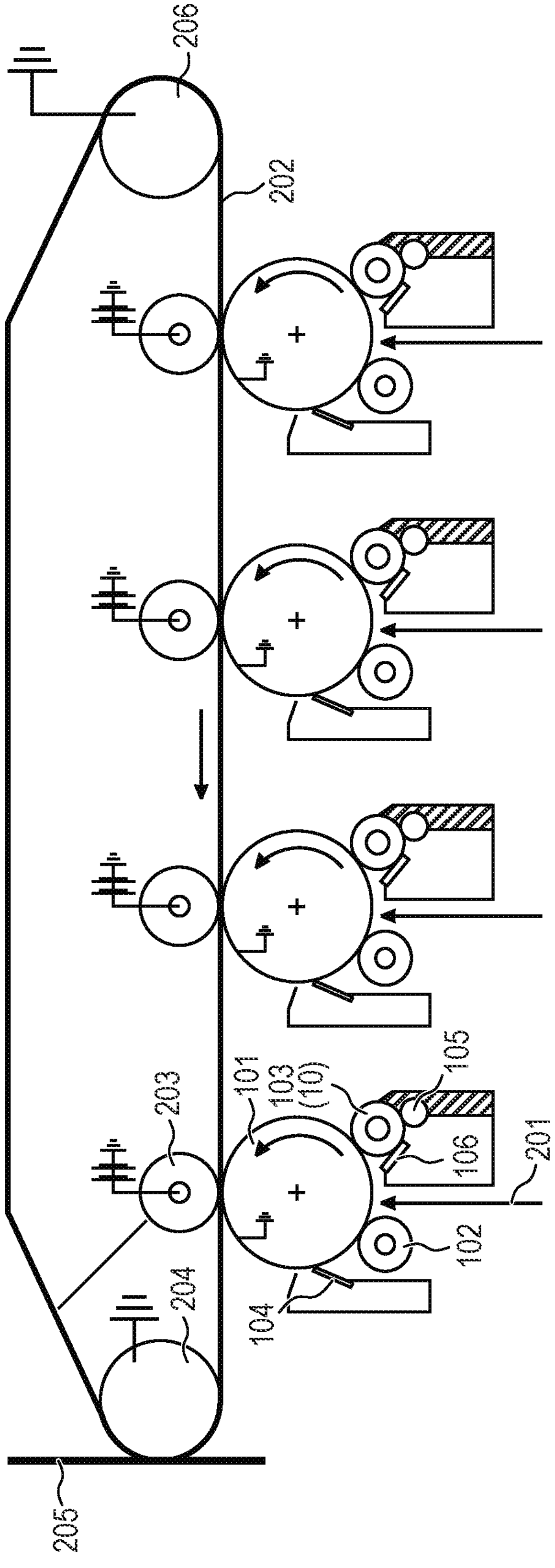
FIG. 5 is a schematic view for illustrating an electrophotographic image forming apparatus according to one aspect of the present disclosure.

FIG. 5 is a schematic configuration view of an electrophotographic image forming apparatus 200 according to one embodiment of the present disclosure. In the example of FIG. 5, the process cartridges illustrated in FIG. 4 are mounted as four cartridges containing toilers of different colors and are adaptable to full color. In addition, the electrophotographic image forming apparatus 200 is an image forming apparatus of an intermediate transfer type in which toner images of the respective colors formed on the image-bearing members 101 are combined into a full-color image on an intermediate transfer member (intermediate transfer belt 202) and transferred onto recording paper 205.

The image-bearing member 101 is uniformly charged (primarily charged) by the charging member 102 connected to a bias power source (not shown). Next, exposure light 201 for writing an electrostatic latent image is applied to the image-bearing member 101 from an exposing device (not shown) to form the electrostatic latent image on the surface of the image-bearing member 101. Any of LED light and laser light may be used as the exposure light.

Next, a toner charged to negative polarity by the developing member 103 is applied to the electrostatic latent image to form a toiler image on the image-bearing member 101. Thus, the electrostatic latent image is converted into a visible image (development). At this time, a voltage is applied to the developing member 103 by a bias power source (not shown). The developing member 103 is brought into contact with the image-bearing member 101 at a certain nip width. The toner image developed on the image-bearing member 101 is primarily transferred onto the intermediate transfer belt 202 serving as a transferring unit.

The transferring unit includes a primary transfer member 203 that is brought into abutment with the back surface of the intermediate transfer belt 202, and through application of a voltage to the primary transfer member 203, the toner image having negative polarity is primarily transferred from the image-bearing member 101 to the intermediate transfer belt 202. The primary transfer member 203 may be a roller shape as illustrated, or may be another blade shape.

When the electrophotographic image forming apparatus 200 is a full-color image forming apparatus, the respective steps of charging, exposure, development, and primary transfer are typically performed for each of a yellow color, a cyan color, a magenta color, and a black color. To that end, in the electrophotographic image forming apparatus 200 illustrated in FIG. 5, a total of the four process cartridges 100 each containing the toner of one of the respective colors are removably mounted onto the main body of the electrophotographic image forming apparatus 200. In addition, the respective steps of charging, exposure, development, and primary transfer are sequentially performed at a predetermined time difference to establish a state in which the toner images of the four colors for representing a full-color image are superimposed on the intermediate transfer belt 202.

The toner images on the intermediate transfer belt 202 are conveyed to a position facing a secondary transfer member 204 along with the rotation of the intermediate transfer belt 202. The recording paper 205 is conveyed into a space between the intermediate transfer belt 202 and the secondary transfer member 204 at a predetermined timing along a conveying route, and the application of a secondary transfer bias to the secondary transfer member 204 transfers the toner images on the intermediate transfer belt 202 onto the recording paper 205. The secondary transfer member 204 is also included in the transferring unit. The recording paper 205 onto which the toner images have been transferred by the secondary transfer member 204 is conveyed to a fixing device (not shown). Then, in the fixing device, the toner images on the recording paper 205 are melted to be fixed. After that, the recording paper 205 is discharged to the outside of the electrophotographic image forming apparatus 200. Thus, a printing operation is completed. The intermediate transfer belt 202 is tensioned by the secondary transfer member 204 and an opposing roller 206 opposed thereto in the intermediate transfer belt, and a predetermined electric potential is applied to the opposing roller 206. The image transfer surface of the intermediate transfer belt 202 is kept clean by a cleaning member (not shown).

In the foregoing, the configuration including the intermediate transfer belt as the transferring unit has been described, but the present disclosure is not limited thereto. A transferring unit of a direct transfer type that directly transfers a toner image from the image-bearing member to the recording paper may be used.

According to one aspect of the present disclosure, a developing roller capable of suppressing the occurrence of density unevenness even when an image is printed on a large number of sheets under a low-temperature, and low-humidity environment can be provided. In addition, according to other aspects of the present disclosure, an electrophotographic process cartridge and an electrophotographic image forming apparatus each including the developing roller can be provided.

EXAMPLES

The present disclosure is specifically described by way of Examples, but the present disclosure is not limited thereto.

Materials used in Examples and Comparative Examples are shown in Table 1.

TABLE 1

| | Abbreviation for material | Name of materials, etc. |
|---|---|---|
| Rubber component | NBR1 | Acrylonitrile-butadiene rubber (product (grade) name: JSR N230SV (acrylonitrile (AN) amount: 35 mass %), manufactured by JSR Corporation) |
| | NBR2 | Acrylonitrile-butadiene rubber (product (grade) name: JSR N260S (AN amount: 15 mass %), manufactured by JSR Corporation) |
| | NBR3 | Acrylonitrile-butadiene rubber (product (grade) name: JSR N220S (AN amount: 42 mass %), manufactured by JSR Corporation) |
| | NBR4 | Acrylonitrile-butadiene rubber (product (grade) name: JSR N220L (AN amount: 43 mass %), manufactured by JSR Corporation) |
| | ECO | Epichlorohydrin rubber (product name: EPION 301, manufactured by Osaka Soda Co., Ltd.) |
| Additive/Electro-conductive agent | $CaCl_2$ | Calcium carbonate (product name: NANOX #30, manufactured by Maruo Calcium Co., Ltd.) |
| | ZnO | Zinc oxide (product name: Zinc Oxide No. 2, manufactured by SAKAI CHEMICAL INDUSTRY CO., LTD) |
| | CB | Carbon black (product name: TOKABLACK #7400, manufactured by Tokai Carbon Co., Ltd.) |
| Vulcanizing agent | S | Sulfur (product name: SULFAX PMC, manufactured by Tsurumi Chemical Industry Co., Ltd) |
| Vulcanization accelerator | TBzTD | Tetrabenzylthiuram disulfide (product name: NOCCELER TBzTD, manufactured by Ouchi Shinko Chemical Industrial Co., Ltd.) |
| Acrylic monomer | AC1 | Bifunctional acrylic monomer (product name: EBECRYL 145, manufactured by Daicel-Allnex Ltd.) |
| | AC2 | Trifunctional acrylic monomer (pentaerythritol triacrylate, manufactured by Daicel-Allnex Ltd.) |
| | AC3 | Monofunctional acrylic monomer (product name: AM-30PG, manufactured by Shin-Nakamura Chemical Co, Ltd.) |
| Polymerization initiator | OMNI | Photopolymerization initiator (product name: Omnirad 184, manufactured by IGM Resins B.V.) |
| Solvent | MEK | Methyl ethyl ketone (manufactured by Kishida Chemical Co., Ltd.) |

Example 11

<Production of Developing Roller>

(Formation of Elastic Layer)

As first mixing, materials for the elastic layer 12 shown in Table 2 below were mixed at a filling ratio of 70 vol %, and a rotation speed of a blade of 30 rpm for 16 minutes with a 6-liter pressure kneader (product name: TD6-15MDX, manufactured by Toshin Co., Ltd.).

TABLE 2

| Classification | Kind | Abbreviation for material | Part(s) by mass |
|---|---|---|---|
| First mixing | Rubber component | NBR1 | 60 |
| | | ECO | 40 |
| | Additive | ZnO | 5 |
| | | $CaCl_2$ | 20 |
| | | CB | 40 |

Then, as second mixing, materials shown in Table 3 below were added to the above-mentioned mixture, and the resultant was bilaterally cut 20 times in total at a front roll rotation speed of 10 rpm, a back roll rotation speed of 8 rpm, and a roll gap of 2 mm with an open roll having a roll diameter of 12 inches (0.30 m). After that, the resultant was subjected to tight milling 10 times at a roll gap of 0.5 mm, to thereby provide a mixture 1.

TABLE 3

| Classification | Kind | Abbreviation for material | Part(s) by mass |
|---|---|---|---|
| Second mixing | Vulcanizing agent | S | 1.0 |
| | Crosslinking accelerator | TBzTD | 3.7 |

A mandrel made of stainless steel (SUS304) having an outer diameter of 6 mm and a length of 270 mm was prepared, and an electroconductive vulcanizing adhesive (product name: "METALOC U-20", manufactured by Toyokagaku Kenkyusho Co., Ltd.) was applied onto a circumferential surface of the mandrel, followed by baking, to thereby produce a substrate.

Next, the mixture 1 was extruded simultaneously with the substrate as produced above while being molded into a cylindrical shape coaxially around the substrate by extrusion molding using a crosshead, to thereby form a layer of the mixture 1 on an outer peripheral surface of the substrate. As the extruder, an extruder having a cylinder diameter of 45 mm (Φ45) and an L/D of 20 was used, and temperatures of a head, a cylinder, and a screw at the time of extrusion were each adjusted to 90° C. Both end portions of the layer of the mixture 1 in the longitudinal direction of the substrate were cut to set the length of the layer of the mixture 1 in the longitudinal direction of the substrate to 237 mm.

After that, the resultant was heated at a temperature of 160° C. for 40 minutes in an electric furnace to vulcanize the layer of the mixture 1, to thereby form a vulcanized member. Then, the surface of the vulcanized member was polished with a polishing machine of a plunge-cut grinding method. The outer diameter was measured with a laser dimension measuring machine (product names: LS-7000 and Sensor Head LS-7030R, manufactured by Keyence Corporation). The outer diameter was measured at a pitch of 10 mm in the longitudinal direction, and the difference between the outer diameter at a position of 10 mm from an end portion of the member and the outer diameter at a position of the center of the member was defined as a crown amount. The outer diameter of the end portion of the finished member was 11.958 mm, and the outer diameter of the center portion thereof was 12.048 mm. Thus, a polished roller having a crown amount of 90 μm in which the thickness of the elastic layer was about 3.0 mm in the center portion was obtained.

The surface of the resultant polished roller was subjected to the following treatment.

(Surface Treatment)

As materials for an impregnation treatment liquid No. 1 for treatment, materials shown in Table 4 below were dissolved and mixed. The polished roller was treated by being immersed in the impregnation treatment liquid No. 1 for 2 seconds, to thereby provide an impregnated roller into which the acrylic monomer component was impregnated. After that, the impregnated roller was air-dried at normal temperature for 30 minutes. Then, the impregnated roller was dried at 90° C. for 1 hour so that the solvent of the liquid was volatilized and the impregnated roller was preheated.

TABLE 4

| Classification | Kind | Abbreviation for material | Part(s) by mass |
|---|---|---|---|
| Impregnation treatment liquid No. 1 | Acrylic monomer | AC1 | 5 |
| | Photopolymerization initiator | OMNI | 0.25 |
| | Solvent | MEK | 100 |

The surface of the impregnated roller after the preheating was irradiated with UV light, to thereby cure the acrylic monomer.

For the UV irradiation, a UV irradiation device including a mechanism for holding and rotating the impregnated roller and a UV lamp arranged in parallel to the impregnated roller was used. The impregnated roller seas irradiated with UV light while being rotated at a rotation speed of 20 rpm, and thus surface treatment was performed.

As the UV lamp, a high-pressure mercury lamp (manufactured by Eye Graphics Co., Ltd.) was used. The illuminance of a wavelength of 365 nm at a position of the surface of the impregnated roller was measured with a UV integrated light quantity meter (main body: U1T-250 (product name) and light receiving portion: UVD-S365 (product name), manufactured by Ushio Inc.), and the output and distance of the lamp were adjusted so that the illuminance became 150 mW.

The dried and preheated impregnated roller was set in the UV irradiation device, and the irradiation time was set to 200 seconds so that the integrated light quantity became about 30,000 mJ. Thus, the UV irradiation was performed. The surface temperature of the elastic layer of the impregnated roller at the start of the UV irradiation was 60° C., and the surface temperature of the elastic layer at the completion of the UV irradiation was 90° C. A developing roller No. 1 was produced as described above. The resultant developing roller was evaluated as described below.

<Evaluation Method>

(Measurement of Current Value (μA) of the Developing Roller)

Figure 8:
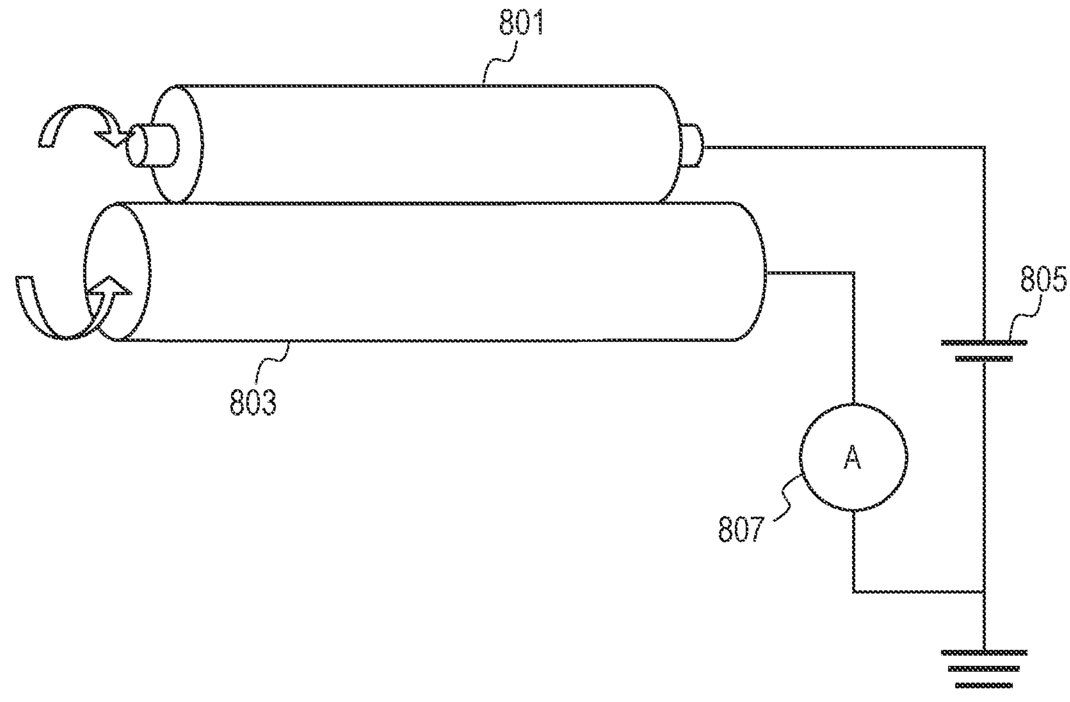
FIG. 8 is a schematic view for explaining a method of measuring a current value of a developing roller.

As shown in FIG. 8, the developing roller 801 to be evaluated was brought into contact with a cylindrical electrode 803 having a diameter of 40 mm made of stainless steel (SUS304) by adding a load of 500 g to both exposed end portions of the mandrel of the developing roller. Then the cylindrical electrode 803 was rotated so that the developing roller was driven to rotate at 24 rpm, i.e. rotation per minute. After that, DC voltage of 50 V was applied between the mandrel and the cylindrical electrode with a DC power supply 805, and a current value was continuously measured with a DC ammeter 807 while rotating the developing roller at one round. The measured current value was averaged and the averaged current value was shown in Table 8, Here, this evaluation was conducted under the environment of temperature of 20° C. and relative humidity of 50%.

(Evaluation of Elastic Modulus)

A region of a cross-section of a developing roller to be measured was cut out into a flake with a diamond knife under a state in which the developing roller was held at −110° C. in a cryomicrotome (product name: EM FC6, manufactured by Leica Microsystems), and a 100-micrometer square flake having a width of 100 μm in its depth direction was produced. The resultant flake was placed on a smooth silicon wafer and allowed to stand under an environment having a room temperature of 25° C. and a humidity of 50% for 24 hours, and then the elastic modulus was measured under the same environment. In the present disclosure, the elastic moduli were measured at the positions P1, P2, and P3 in each of the first, second, third, and fourth regions illustrated in FIG. 3.

For the measurement, a scanning probe microscope (SPM) (product name: MFP-3D-Origin, manufactured by Oxford Instruments) and a silicon probe (product name: OMCL-AC160, manufactured by Olympus Corporation, tip radius of curvature: 8 nm) were used. The spring constant and proportional constant of the probe were recognized to be 22 nN/nm and 82.59 nm/V, respectively, by a thermal noise method using the SPM.

At this time, the elastic modulus was calculated based on the Hertz theory by measuring a force curve 10 times, and determining the arithmetic average of 8 values excluding the highest value and the lowest value.

(Evaluation of Blank Dots)

The developing roller produced as described above was incorporated into a laser printer (product name: HP Color LaserJet Enterprise M652dn, manufactured by Hewlett-Packard Company) and a cyan cartridge (product name: HP 656X High Yield Cyan Original LaserJet Toner Cartridge, manufactured by Hewlett-Packard Company) for the laser printer under a low-temperature and low-humidity environment having a temperature of 15° C. and a relative humidity of 10%, and was allowed to stand under the above-mentioned environment for 48 hours, to thereby sufficiently perform aging.

After the aging, a solid black image having a print percentage of 100% was printed, and the presence or absence of the occurrence of blank dots on the image was recognized. Blank dots were evaluated by measuring an image density with a spectral densitometer (product name: 508, manufactured by X-Rite Inc.), and calculating an image density difference in an image area, to thereby evaluate density unevenness.

For the image density difference, the density was measured at each of three points of end portions and a center portion of the image area, and the absolute value of the difference in image density between the end portion and the center portion was defined as an image density difference, and blank dots were evaluated based on the following criteria. The end portion of the image area refers to a position of 10 mm inward from the edge of the image.

Evaluation Criteria

Rank A: Image density difference of solid black image is less than 0.20.

Rank B: Image density difference of solid black image is 0.20 or more and less than 0.30.

Rank C: image density difference of solid black image is 0.30 or more and less than 0.50.

Rank D: Image density difference of solid black image is 0.50 or more.

(Evaluation of Density Unevenness)

After blank dots were evaluated, an image having a print percentage adjusted to 0.5% was repeatedly printed on two sheets at a time to a total of 30,000 sheets. After that, the cyan cartridge was disassembled, and the developing roller was removed. Then, the developing roller was incorporated again into another new cyan cartridge, and thus the image was printed on 30,000 sheets in the same manner. The foregoing was repeated for 10 cyan cartridges to print the image on a total of 300,000 sheets.

After that, density unevenness was recognized. In order to evaluate density unevenness, a halftone image was printed with the cyan cartridge in which the developing roller was incorporated at the time of completion of the above-mentioned printing on 300,000 sheets. The halftone image was defined as an image in which horizontal lines each having a width of one dot extending in a perpendicular direction to the rotation direction of the image-beating member were drawn at intervals of one dot in the rotation direction. After the printing, an image density was measured with a spectral densitometer (product name: 508, X-Rite, Inc.), and an image density difference in an image area was calculated, to thereby evaluate density unevenness.

For the image density difference, the density was measured at each of three points of end portions and a center portion of the image area, and the absolute value of the difference in image density between the end portion and the center portion was defined as an image density difference, and density unevenness was evaluated based on the following criteria. The end portion of the image area refers to a position of 10 mm inward from the edge of the image.

Evaluation Criteria

Rank A: Image density difference of halftone image is less than 0.05.

Rank B: Image density difference of halftone image is 0.05 or more and less than 0.10.

Rank C: Image density difference of halftone image is 0.10 or more and less than 0.30.

Rank D: Image density difference of halftone image is 0.30 or more.

(Evaluation of Resistance Unevenness ΔV on Outermost Surface of Elastic Layer under Low-temperature and Low-humidity Environment)

When there is resistance unevenness on the outermost surface of the developing roller, charge-up occurs in a region in which the resistance is high. As a result, deviation occurs in a developing bias between the developing roller and the image-bearing member, resulting in a density difference. Accordingly, resistance unevenness of the outermost surface of the developing roller leads to density unevenness.

In order to quantify the surface resistance unevenness of the developing roller, evaluation was performed through use of surface potential unevenness (ΔV) calculated by applying electric charge to the surface of the developing roller with a corona discharger 41, and then measuring residual charge with a surface potential gauge. The reason for using the above-mentioned evaluation method is as described below.

As methods that are generally used for measuring resistance, there are given, for example, a volume resistivity and a surface resistivity as specified in TIS K6911.

The resistance unevenness on the outermost surface of the developing roller influences the density unevenness of an image actually printed in an electrophotographic process. However, the results obtained by the general resistance measurement method as described above are macroscopic resistance values including the information on the resistance of an inner portion as well as the outermost surface.

Accordingly, information on the resistance of only the outermost surface of the developing roller, which is directly related to the density unevenness of the image printed in the electrophotographic process, cannot be obtained. In view of the foregoing, in this Example, a method of measuring residual charge after corona discharge was used.

In the method using corona discharge, corona discharge is performed from the surface side of the elastic layer, and hence the resistance unevenness on the outermost surface of the developing roller as described above can be evaluated regardless of the resistance of the inner portion.

A high-resistance portion on the outermost surface of the developing roller has a relatively large amount of residual charge after corona discharge, and hence the value of the surface potential is measured to be high. Accordingly, through recognition of unevenness of the surface potential of the outermost surface of the developing roller, the resistance unevenness of the outmost surface of the developing roller can be recognized.

The ΔV was calculated by measuring the surface potential of the entire surface of the elastic layer of the developing roller and using the resultant surface potential data of the entire surface. A specific method is described below.

Figure 6:
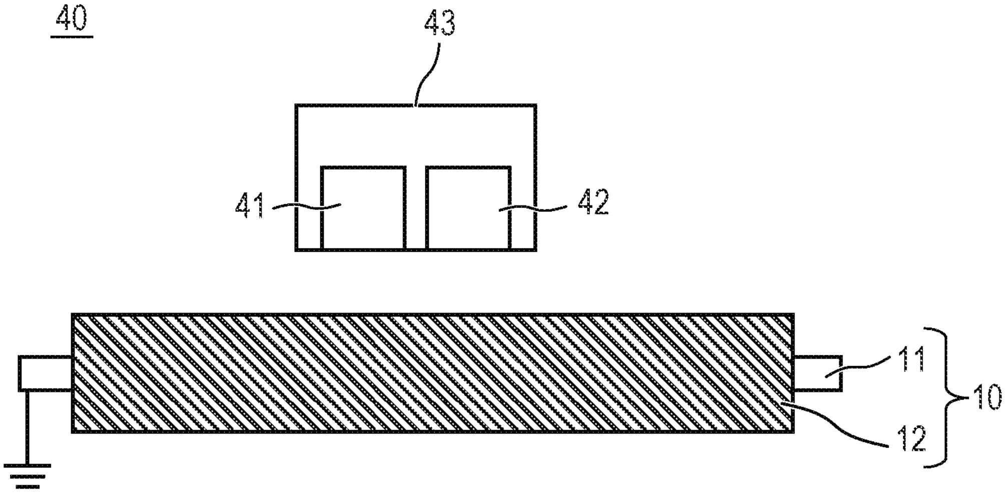
FIG. 6 is a schematic view for illustrating a dielectric relaxation measuring device used for measuring surface potential unevenness in the present disclosure.

As an evaluation device, a dielectric relaxation measuring device (product name: DRA-2000L, manufactured by Quality Engineering Associates Inc.) 40 as illustrated in FIG. 6 was used. The overview of the dielectric relaxation measuring device 40 is described with reference to FIG. 6. The dielectric relaxation measuring device 40 includes a head 43 in which the corona discharger 41 and a surface 42 of a surface potential gauge are integrated.

In addition, the distance from the position at which discharge is performed with the corona discharger 41 within the head 43 to the center of the probe 42 of the surface potential gauge is 25 mm, and hence delay time is caused between the completion of the discharge to the measurement depending on the moving speed of the head 43. The head 43 can move in parallel to the longitudinal direction of the installed developing roller 10. In addition, the electric charge generated from the corona discharger 41 is applied toward the surface of the elastic layer 12 of the developing roller 10.

Measurement is performed as described below when the head 43 is moved while corona discharge is performed.

1) Electric charge is applied from the corona discharger 41 to the surface of the elastic layer 12 of the developing roller 10.
2) The electric charge on the surface of the elastic layer 12 escapes to the ground through the electroconductive substrate 11 during the delay time before the probe 42 of the surface potential gauge reaches the measurement position.
3) The amount of residual charge on the surface of the elastic layer 12 is measured as an electric potential with a potential gauge.

The dielectric relaxation measuring device 40 and the developing roller 10 were allowed to stand under a low-temperature and low-humidity (15° C./10% RH) environment for 24 hours or more, to thereby sufficiently perform aging.

A master made of stainless steel (SUS304) having the same outer diameter as that of the developing roller 10 is installed in the dielectric relaxation measuring device 40, and this master is short-circuited to the ground. Next, the distance between the surface of the master and the probe of the surface potential gauge is adjusted to 0.76 mm, and the surface potential gauge is calibrated to zero.

After the above-mentioned calibration, the master is removed, and the developing roller 10 to be measured is installed in the dielectric relaxation measuring device 40.

The measurement conditions are set so that the bias setting of the corona discharger 41 is 8 kV, the moving speed of a scanner is 400 min/sec, and the sampling interval is 0.5 mm or less, and the measurement of the developing roller 10 in the longitudinal direction is performed. The range for performing data collection was set to a range of (8/10)L, in which L represented the length of the elastic layer 12 of the developing roller 10 in the longitudinal direction, and which excluded the regions from both ends to (1/10)L. Further, the measurement in the longitudinal direction was performed every time the developing roller was rotated in increments of 10° with respect to the rotation direction of the developing roller, and the foregoing was repeated 36 times to provide surface potential data for one rotation of the roller.

The potential data thus obtained is represented by a matrix of "m" rows and 36 columns in which elements are the potential value obtained at each longitudinal position in a vertical direction and the potential value obtained at each phase in increments of 10° in a horizontal direction. The numerical value of the "m" is determined in accordance with the sampling interval.

The ΔV is calculated from the surface potential data. The ΔV is obtained by calculating an average value of the surface potentials in the respective ranges obtained by dividing the above-mentioned range of (8/10) L in the longitudinal direction of the elastic layer of the developing roller into five parts, and calculating a ratio of a maximum value and a minimum value of the resultant average surface potentials in the live ranges. Specifically, first, the matrix of "m" rows and 36 columns obtained above is equally divided into five parts for every m/5 rows. With regard to each matrix obtained by equal division into five parts, the values of all elements, that is, (m/5)×36 elements are arithmetically averaged, and the resultant value is defined as the average surface potential in each range. The value obtained by calculating ΔV=Vmax−Vmin, where Vmax and Vmin represented the maximum value and minimum value of the average surface potentials in the five parts, respectively, was defined as the surface potential unevenness of the developing roller.

Examples 2 to 5 and Examples 7 to 12

Materials shown in Table 5 were used for producing a polished roller, and materials shown in Table 6 were used for preparing a treatment liquid to be used for surface treatment. Each of developing rollers No. 2 to No. 5 and No. 7 to No. 12 was produced by combining the polished roller and the impregnation treatment liquid as shown in Table 7 by the same method as that of Example 1 except for the foregoing and was evaluated in the same manner as in Example 1. The evaluation results are shown in Table 7.

Example 6

Materials shown in Table 5 were used for producing a polished roller, and an impregnation treatment liquid No. 4 shown in Table 6 was used for surface treatment. Further, the integrated light quantity of UV light was set to 50,000 mJ/cm$^2$. A developing roller No. 6 was produced by the same method as that of Example 1 except for the foregoing and was evaluated in the same manner as in Example 1. The evaluation results are shown in Table 7.

Example 13

<Production of Developing Roller>

(Production of Substrate)

An aluminum cylindrical tube ground to an outer diameter of 10 mm was prepared as an electroconductive substrate 1. The substrate was subjected to surface treatment by being immersed in a washing tank adjusted to a pH of 12.0 for 3 minutes. Next, further surface treatment was performed for the convenience of later processing for adjusting the shape of an end surface. That is, in order to simplify the removal of a layer formed from both end portions of the cylindrical tube to a portion of 0.5 mm on an inner side, a 0.01% aqueous solution of citric acid was applied to the entire circumferential surface from both the end portions to the portion of 0.5 mm on the inner side to produce a cylindrical tube substrate.

(Formation of Elastic Layer)

A mixture 1 was prepared by the same method as that of Example 1. Next, the mixture 1 was extruded simultaneously with the cylindrical tube substrate while being molded into a cylindrical shape coaxially around the cylindrical tube substrate by extrusion molding using a crosshead, to thereby form a layer of the mixture 1 on the outer peripheral surface of the cylindrical tube substrate. As the extruder, an extruder having a cylinder diameter of 45 mm (Φ45) and an LID of 20 was used, and temperatures of a head, a cylinder, and a screw at the time of extrusion were each adjusted to 90° C. Both end portions of the layer of the mixture 1 in the longitudinal direction of the cylindrical tube substrate were cut.

After that, the resultant was heated at a temperature of 160° C. for 40 minutes in an electric furnace to vulcanize the layer of the mixture 1, to thereby form a vulcanized member. Then, the surface of the vulcanized member was polished with a polishing machine of a plunge-cut grinding method. The outer diameter was measured with a laser dimension measuring machine (product names: LS-7000 and Sensor Head LS-7030R, manufactured by Keyence Corporation). The outer diameter was measured at a pitch of 10 mm the longitudinal direction, and the difference between the outer diameter at a position of 10 mm from an end portion of the member and the outer diameter at a position of the center of the member was defined as a crown amount. The outer diameter of the end portion of the finished member was 10.600 mm, and the outer diameter of the center portion thereof was 10.650 mm. Thus, a polished roller having a crown amount of 50 μm in which the thickness of the elastic layer was 0.30 mm was obtained. The surface of the resultant polished roller was subjected to the following treatment, (Surface Treatment)

The resultant polished roller was subjected to surface treatment, by the same method as that of Example 1 to provide a developing roller No. 13. The elastic moduli of the developing roller No, 13 in the first to fourth regions were evaluated by the same method as that of Example 1.

<Evaluation Method>

(Evaluation of Blank Dots)

The evaluation was performed by the same method as that of Example 1 except that a color laser printer (product name: HP LaserJet Pro M102w Printer, manufactured by Hewlett-Packard Company) and a black cartridge (product name: HP 17A (CF217A) Black Original LaserJet Toner Cartridge, manufactured by Hewlett-Packard Company) for the color laser printer were used as a printer for evaluation, (Evaluation of Density Unevenness)

After blank dots were evaluated, an image having a print percentage adjusted to 0.5% was repeatedly printed on two sheets at a time to a total of 3,000 sheets. After that, the cartridge was disassembled, and the developing roller was removed. Then, the developing roller was incorporated again into another new cyan cartridge. The image was similarly printed on 30,000 sheets with this cartridge. The foregoing was repeated to print the image on a total of 300,000 sheets. After that, the density unevenness was recognized. In order to evaluate density unevenness, a halftone image was printed with the cartridge in which the developing roller was incorporated at the time of completion of the above-mentioned printing on 20,000 sheets. The halftone image was defined as an image in which horizontal lines each having a width of one dot extending in a perpendicular direction to the rotation direction of the image-bearing member were drawn at intervals of one dot in the rotation direction. After the printing, an image density was measured with a spectral densitometer (product name: 508, X-Rite, Inc.), and an image density difference in an image area was calculated, to thereby evaluate density unevenness.

For the image density difference, the density was measured at each of three points of end portions and a center portion of the image area, and the absolute value of the difference in image density between the end portion and the center portion was defined as an image density difference, and density unevenness was evaluated based on the following criteria. The end portion of the image area refers to a position of 10 mm inward from the edge of the image.

Evaluation Criteria

Rank A: Image density difference of halftone image is less than 0.05.

Rank B: image density difference of halftone image is 0.05 or more and less than 0.10.

Rank C: Image density difference of halftone image is 0.10 or more and less than 0.30.

Rank D: Image density difference of halftone image is 0.30 or more.

Comparative Example 1

A developing roller No. 14 was produced by the same method as that of Example 1 except that the integrated light quantity of UV light was set to 3,000 $mJ/cm^2$, and was evaluated in the same manner as in Example 1.

Comparative Example 2

A developing roller No. 15 was produced through use of materials shown in Table 5 for producing a polished roller and the impregnation treatment liquid No. 4 shown in Table 6 serving as a treatment liquid used for surface treatment. In the surface treatment of the developing roller No. 15, the impregnation time into the treatment liquid was set to 10 seconds, and the drying conditions after impregnation were set to 25° C. for 10 minutes. After that, the integrated light quantity of UV light was set to 3,000 $mJ/cm^2$. When the irradiation of the elastic layer of the polished roller was started at a surface temperature of 25° C., the surface temperature after UV irradiation was 40° C. The developing roller No. 15 thus produced was evaluated in the same manner as in Example 1.

Comparative Example 3

A polished roller was obtained in the same manner as in Example 1. The polished roller was not subjected to the surface treatment of Example 1, but instead was subjected to electron beam treatment.

Figure 7:
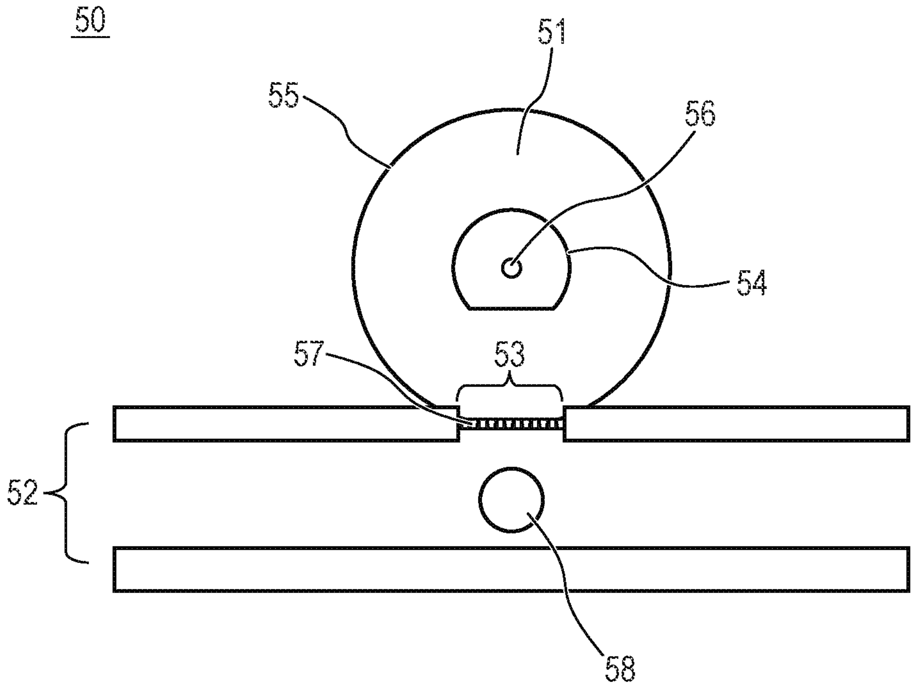
FIG. 7 is a schematic view for illustrating a treatment device using electron beams used for producing a developing roller according to Comparative Example 3.

FIG. 7 is a schematic view of an electron beam irradiation device 50. The electron beam irradiation device 50 is a device capable of irradiating the surface of a member with electron beams while rotating a polished roller 58, and includes an electron beam generating portion 51, an irradiation chamber 52, and an irradiation port 53 as illustrated in FIG. 7.

The electron beam generating portion 51 includes a terminal 54 that generates electron beams and an acceleration tube 55 that accelerates the electron beams generated in the terminal 54 in a vacuum space (acceleration space). In addition, in order to prevent electrons from colliding with gas molecules and losing energy, the inside of the electron beam generating portion is kept in a vacuum of $10^{-3}$ Pa or more and $10^{-6}$ Pa or less by a vacuum pump (not shown) or the like. When a filament 56 is heated through an electric current by a power source (not shown), the filament 56 emits thermions, and only those thermions that have passed through the terminal 54 out of the thermions are effectively taken out as electron beams. Then, after being accelerated in the acceleration space within the acceleration tube 55 by the acceleration voltage, the electron beams pass through an irradiation port foil 57 to be radiated to the polished roller 58 conveyed in the irradiation chamber 52 below the irradiation port 53. When the polished roller 58 is irradiated with electron beams, the inside of the irradiation chamber 52 may be set to a nitrogen atmosphere.

Through use of the electron beam irradiation device 50 described above, the polished roller 58 was treated at a time when the dose reached 200 kGy at an acceleration voltage of 50 kV to provide a developing roller No. 16. The developing roller No. 16 was evaluated in the same manner as in Example 1.

Comparative Example 4

As the surface treatment of a polished roller, only UV irradiation at 10,000 mJ was performed without impregnation into the treatment liquid and drying. A developing roller No. 17 was produced by the same method as that of Example 1 except for the foregoing and was evaluated in the same manner as in Example 1.

Comparative Example 5

As the surface treatment of a polished roller, only UV irradiation at 10,000 mJ was performed without impregnation into the treatment liquid and drying. A developing roller No. 18 was produced by the same method as that of Example 13 except for the foregoing and was evaluated in the same manner as in Example 13.

TABLE 5

| Classification | Kind | Abbreviation name for material | Example 1 | 2 | 3 | 4 | 5 | 6 | 7 | 8 | 9 | 10 | 11 |
|---|---|---|---|---|---|---|---|---|---|---|---|---|---|
| First mixing | Rubber component | NBR1 | 60 | 60 | — | — | 60 | 60 | — | — | — | 100 | — |
| | | NBR2 | — | — | — | 60 | — | — | — | — | 100 | — | — |
| | | NBR3 | — | — | 60 | — | — | — | — | 100 | — | — | — |
| | | NBR4 | — | — | — | — | — | — | 60 | — | — | — | 100 |
| | | ECO | 40 | 40 | 40 | 40 | 40 | 40 | 40 | — | — | — | — |
| | Additive | ZnO | 5 | 5 | 5 | 5 | 5 | 5 | 5 | 5 | 5 | 5 | 5 |
| | | $CaCl_2$ | 20 | 20 | 20 | 20 | 20 | 20 | 20 | 20 | 20 | 20 | 20 |
| | | CB | 40 | 40 | 40 | 40 | 40 | 40 | 40 | 40 | 40 | 40 | 40 |
| Second mixing | Vulcanizing agent | S | 1.0 | 1.0 | 1.0 | 1.0 | 1.0 | 1.0 | 1.0 | 1.0 | 1.0 | 1.0 | 1.0 |
| | Vulcanization accelerator | TBzTD | 3.7 | 3.7 | 1.7 | 3.7 | 37 | 3.7 | 37 | 37 | 3.7 | 3.7 | 3.7 |

| Classification | Kind | Abbreviation name for material | Example 12 | Example 13 | Comparative Example 1 | 2 | 3 | 4 | 5 |
|---|---|---|---|---|---|---|---|---|---|
| First mixing | Rubber component | NBR1 | — | 100 | 60 | — | 60 | 60 | 60 |
| | | NBR2 | — | — | — | — | — | — | — |
| | | NBR3 | — | — | — | — | — | — | — |
| | | NBR4 | 100 | — | — | 100 | — | — | — |
| | | ECO | — | — | 40 | — | 40 | 40 | 40 |
| | Additive | ZnO | 5 | 5 | 5 | 5 | 5 | 5 | 5 |
| | | $CaCl_2$ | 20 | 20 | 20 | 20 | 20 | 20 | 20 |
| | | CB | 40 | 40 | 40 | 40 | 40 | 40 | 40 |
| Second mixing | Vulcanizing agent | S | 1.0 | 1.0 | 1.0 | 1.0 | 1.0 | 1.0 | 1.0 |
| | Vulcanization accelerator | TBzTD | 3.7 | 3.7 | 3.7 | 3.7 | 3.7 | 3.7 | 3.7 |

TABLE 6

| Kind | Abbreviation for material name | Impregnation treatment liquid No. 1 | 2 | 3 | 4 |
|---|---|---|---|---|---|
| Acrylic monomer | AC1 | 5 | — | — | — |
| | AC2 | — | — | 5 | 20 |
| | AC3 | — | 5 | — | — |

TABLE 6-continued

| Kind | Abbreviation for material name | Impregnation treatment liquid No. 1 | 2 | 3 | 4 |
|---|---|---|---|---|---|
| Photopolymerization initiator | OMNI | 0.25 | 0.25 | 0.25 | 1.00 |
| Solvent | MEK | 100 | 100 | 100 | 100 |

TABLE 7

| | | Developing roller No. | Rubber component AN amount (wt %) | Rubber component Number of functional groups | Impregnation No. treatment liquid | Elastic modulus (MPa) in first remon E11 | E12 | E13 | Elastic modulus (MPa) in second region E21 | E22 | E23 |
|---|---|---|---|---|---|---|---|---|---|---|---|
| Example | 1 | 1 | 35 | 2 | 1 | 901 | 905 | 906 | 309 | 310 | 311 |
| | 2 | 2 | 35 | 1 | 2 | 501 | 500 | 503 | 301 | 302 | 301 |
| | 3 | 3 | 42 | 2 | 1 | 860 | 866 | 865 | 352 | 355 | 353 |
| | 4 | 4 | 15 | 2 | 1 | 505 | 506 | 504 | 111 | 115 | 113 |
| | 5 | 5 | 35 | 3 | 3 | 2,005 | 2,010 | 2,011 | 1,002 | 1,003 | 1,005 |
| | 6 | 6 | 35 | 3 | 4 | 5,011 | 5,020 | 5,016 | 2,123 | 2,125 | 2,120 |
| | 7 | 7 | 43 | 2 | 3 | 500 | 501 | 500 | 351 | 352 | 354 |
| | 8 | 8 | 42 | 2 | 1 | 1,000 | 1,001 | 1,004 | 700 | 701 | 702 |
| | 9 | 9 | 15 | 2 | 1 | 702 | 703 | 701 | 401 | 403 | 402 |
| | 10 | 10 | 35 | 2 | 1 | 904 | 903 | 904 | 400 | 401 | 403 |
| | 11 | 11 | 43 | 2 | 1 | 1,502 | 1,501 | 1,504 | 1,000 | 1,001 | 1,000 |
| | 12 | 12 | 43 | 3 | 3 | 2,001 | 2,003 | 2,001 | 1,520 | 1,521 | 1,523 |
| | 13 | 13 | 35 | 2 | 1 | 901 | 905 | 906 | 309 | 310 | 311 |
| Comparative Example | 1 | 14 | 35 | 2 | 1 | 100 | 101 | 100 | 71 | 69 | 70 |
| | 2 | 15 | 43 | 3 | 4 | 131 | 130 | 130 | 121 | 121 | 120 |
| | 3 | 16 | 35 | — | — | 402 | 403 | 402 | 550 | 551 | 550 |
| | 4 | 17 | 35 | — | — | 151 | 149 | 150 | 50 | 51 | 49 |
| | 5 | 18 | 35 | — | — | 151 | 149 | 150 | 50 | 51 | 49 |

TABLE 7-continued

| | | Elastic modulus (MPa) in third region | | | Elastic modulus (MPa) in fourth region | | | Elastic modulus parameter (left-hand side of each formula) | | |
|---|---|---|---|---|---|---|---|---|---|---|
| | | E31 | E32 | E33 | E41 | B42 | E43 | Formula (4) | Formula (5) | Formula (6) |
| Example | 1 | 150 | 152 | 154 | 21 | 23 | 22 | 0.85 | 0.85 | 0.85 |
| | 2 | 150 | 151 | 151 | 21 | 22 | 21 | 0.73 | 0.73 | 0.73 |
| | 3 | 276 | 275 | 275 | 52 | 53 | 51 | 0.72 | 0.73 | 0.72 |
| | 4 | 53 | 55 | 52 | 14 | 16 | 15 | 0.92 | 0.92 | 0.92 |
| | 5 | 251 | 253 | 254 | 21 | 22 | 20 | 0.88 | 0.88 | 0.88 |
| | 6 | 510 | 515 | 517 | 20 | 21 | 20 | 0.90 | 0.90 | 0.90 |
| | 7 | 305 | 306 | 306 | 100 | 100 | 100 | 0.49 | 0.49 | 0.49 |
| | 8 | 550 | 555 | 551 | 100 | 100 | 100 | 0.50 | 0.50 | 0.50 |
| | 9 | 203 | 202 | 201 | 50 | 50 | 50 | 0.77 | 0.77 | 1.77 |
| | 10 | 302 | 301 | 303 | 70 | 71 | 70 | 0.72 | 0.72 | 0.72 |
| | 11 | 825 | 824 | 823 | 110 | 111 | 110 | 0.49 | 0.49 | 0.49 |
| | 12 | 1,080 | 1,082 | 1,081 | 110 | 111 | 110 | 0.49 | 0.49 | 0.49 |
| | 13 | 150 | 152 | 154 | 21 | 23 | 22 | 0.85 | 0.85 | 0.85 |
| Comparative | 1 | 60 | 61 | 60 | 20 | 21 | 20 | 0.50 | 0.50 | 0.50 |
| Example | 2 | 115 | 117 | 116 | 110 | 111 | 110 | 0.76 | 0.68 | 0.70 |
| | 3 | 450 | 451 | 451 | 403 | 404 | 403 | 48.00 | 48.00 | 49.00 |
| | 4 | 40 | 41 | 40 | 20 | 22 | 21 | 0.85 | 0.85 | 0.85 |
| | 5 | 40 | 41 | 40 | 20 | 22 | 21 | 0.85 | 0.85 | 0.85 |

TABLE 8

| | | | Averaged Current Value (μA) of | Evaluation of image | | | | |
|---|---|---|---|---|---|---|---|---|
| | | | | Blank dots | | Density unevenness | | |
| | | Developing roller No. | Developing Roller | Evaluation rank | Image density difference | Evaluation rank | Image density difference | ΔV (V) |
| Example | 1 | 1 | 150 | A | 0.12 | A | 0.02 | 2 |
| | 2 | 2 | 150 | A | 0.10 | A | 0.02 | 3 |
| | 3 | 3 | 160 | A | 0.14 | A | 0.02 | 3 |
| | 4 | 4 | 140 | A | 0.05 | A | 0.02 | 2 |
| | 5 | 5 | 145 | A | 0.09 | A | 0.02 | 2 |
| | 6 | 6 | 100 | A | 0.10 | A | 0.02 | 2 |
| | 7 | 7 | 162 | A | 0.17 | B | 0.06 | 6 |
| | 8 | 8 | 150 | A | 0.17 | A | 0.02 | 4 |
| | 9 | 9 | 130 | A | 0.14 | A | 0.02 | 3 |
| | 10 | 10 | 135 | A | 0.15 | A | 0.02 | 4 |
| | 11 | 11 | 140 | A | 0.18 | B | 0.08 | 8 |
| | 12 | 12 | 130 | A | 0.18 | B | 0.09 | 9 |
| | 13 | 13 | 130 | A | 0.13 | A | 0.02 | 2 |
| Comparative | 1 | 14 | 200 | A | 0.05 | D | 0.32 | 21 |
| Example | 2 | 15 | 10 | B | 0.21 | D | 0.35 | 25 |
| | 3 | 16 | 150 | D | 0.75 | D | 0.33 | 23 |
| | 4 | 17 | 160 | A | 0.15 | D | 0.31 | 20 |
| | 5 | 18 | 150 | A | 0.15 | D | 0.31 | 20 |

In any of Examples 1 to 13, the E11, the E12, and the E13 were each 500 MPa or more. As a result, the ΔV was able to be suppressed to 9 V or less even after printing on a large number of sheets, and an image of good quality with the rank A or the rank B in density unevenness was able to be obtained. In particular, in Examples 1 to 10 and Example 13, the E41, the E42, and the E43 were each 100 MPa or less, and the ΔV values were lower than those of Examples 11 and 12 in which the E41, the E42, and the E43 were more than 100 MPa. Further, in Examples 1 to 6, 8 to 10, and 13, any of the left-hand side of the formula (4): (E31−E11)/(E41−E11), the left-hand side of the formula (5): (E32−E12)/(E42−E12), and the left-hand side of the formula (6): (E33−E13)/(E43−E13) were each 0.50 or more. As a result, the ΔV was able to be suppressed to 4 V or less, and an image of good quality with the rank A in density unevenness was obtained.

Meanwhile, in Comparative Example 2, the drying after the impregnation treatment was performed at normal temperature, and the surface temperature of the elastic layer at the time of UV irradiation was 50° C. or less. Because of this, the curing of the monomer was insufficient, and the E11, the E12, and the E13 were each less than 500 MPa. As a result, the density unevenness was determined to be the rank D. In Comparative Example 1, it is conceived that the curing of the monomer was insufficient because the integrated light quantity of UV light was insufficient, and hence the E11, the E12, and the E13 were each less than 500 MPa, with the result that the density unevenness was determined to be the rank D.

In Comparative Examples 4 and 5, the impregnation step into the treatment liquid was not performed, and only the UV treatment step was performed, Because of this, in the developing rollers according to those Comparative Examples, the first region did not contain a cured product of an acrylic monomer. It is conceived that, because of the foregoing, the E11, the E12, and the E13 were each less than 500 MPa, and the evaluation results of the density unevenness were determined to be the rank D.

In Comparative Example 3, electron beam irradiation was performed as surface treatment. The electron beams penetrate from an irradiated surface to a deeper portion, and hence the elastic modulus of the portion deeper than the first region of the elastic layer is also increased. It is conceived that, because of the foregoing, the first region of the elastic layer was preferentially strained, and the $\Delta V$ was increased, with the result that the evaluation results of the density unevenness were determined to be the rank D. In addition, the evaluation results of blank dots were also determined to the rank D. It is conceived that the foregoing was caused by the fact that the elastic modulus of the portion deeper than the first region of the elastic layer was increased, and hence the nip with the image-bearing member became non-uniform.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A developing roller comprising:

an electroconductive substrate; and an electroconductive elastic layer constituted by a single layer on an outer periphery of the electroconductive substrate, the elastic layer containing a diene-based rubber, and having a thickness of 0.30 mm or more, and the elastic layer having a crown shape in which an outer diameter of a center portion in a longitudinal direction along an axis of the substrate is larger than an outer diameter of each of both end portions in the longitudinal direction, wherein E11, the E12, and the E13 are each 500 MPa or more, where E11, E12 and E13 are elastic moduli in a first region between an outer surface of the elastic layer and a point at a depth of 0.1 μm from the outer surface of the elastic layer in cross-sections in a thickness direction at positions P1, P2 and P3 respectively, the positions P1, P2 and P3 being positions of (1/10)L, (1/2)L, and (9/10)L, from one end to another end of the elastic layer in the longitudinal direction of the elastic layer, where L is a length of the elastic layer in the longitudinal direction of the elastic layer, and wherein the elastic layer further contains a cured product of an acrylic monomer in the first region, the acrylic monomer including at least one or more of acryloyl groups and methacryloyl groups.

2. The developing roller according to claim 1, wherein the elastic layer has a thickness of at least 0.30 mm or more and 3.00 mm or less.

3. The developing roller according to claim 1, wherein E11, E12, E13, E21, E22, E23, E31, E32, and E33 satisfy formulae (1) to (3):

$$E11 \geq E21 \geq E31 \quad (1);$$

$$E12 \geq E22 \geq E32 \quad (2); \text{ and}$$

$$E13 \geq E23 \geq E33 \quad (3),$$

where E21, E22 and E23 are elastic moduli in a second region between a point at a depth of 0.5 μm from the outer surface of the elastic layer and a point at a depth of 0.6 μm from the outer surface of the elastic layer in the cross-sections of the elastic layer at the positions P1, P2 and P3 respectively, and E31, E32 and E33 are elastic moduli in a third region between a point at a depth of 1.0 μm and a point at a depth of 1.1 μm from the outer surface of the elastic layer in the cross-sections of the elastic layer at the positions P1, P2 and P3 respectively.

4. The developing roller according to claim 3, wherein E41, E42, and E43 are each 100 MPa or less, where E41, E42 and E43 are elastic moduli in a fourth region between a point at a depth of 5.0 μm from the outer surface of the elastic layer and a point at a depth of 5.1 μm from the outer surface of the elastic layer in the cross-sections of the elastic layer at the positions P1, P2, and P3 respectively.

5. The developing roller according to claim 4, wherein E11, E31, and E41, E12, E32, and E42, and E13, E33, and E43 satisfy formulae (4) to (6):

$$(E31-E11)/(E41-E11) \geq 0.50 \quad (4);$$

$$(E32-E12)/(E42-E12) \geq 0.50 \quad (5); \text{ and}$$

$$(E33-E13)/(E43-E13) \geq 0.50 \quad (6).$$

6. The developing roller according to claim 1, wherein the diene based rubber is at least one selected from the group consisting of a natural rubber, an isoprene rubber, an acrylonitrile-butadiene rubber, a styrene-butadiene rubber, a butadiene rubber, a chloroprene rubber.

7. The developing roller according to claim 1, wherein the diene-based rubber is an acrylonitrile-butadiene rubber.

8. The developing roller according to claim 7, wherein the acrylonitrile-butadiene rubber contains acrylonitrile in an amount of 15 mass % or more and 42 mass % or less.

9. The developing roller according to claim 1, wherein the elastic layer contains an electroconductive agent.

10. The developing roller according to claim 9, wherein the electroconductive agent is carbon black.

11. The developing roller according to claim 1, wherein the elastic layer has a volume resistivity in a range of $10^3$ Ωcm or more and $10^{11}$ Ωcm or less.

12. A process cartridge, which is removably mounted onto a main body of an electrophotographic image forming apparatus, the process cartridge comprising a developing roller, wherein the developing roller includes an electroconductive substrate and an electroconductive elastic layer constituted by a single layer on an outer periphery of the substrate, the elastic layer contains a diene-based rubber, and has a thickness of 0.30 mm or more, and the elastic layer has a crown shape in which an outer diameter of a center portion in a longitudinal direction along an axis of the substrate is larger than an outer diameter of each of both end portions in the longitudinal direction, wherein E11, the E12, and the E13 are each 500 MPa or more, where E1, E2 and E3 are elastic moduli in a first region from an outer surface of the elastic layer to a depth of 0.1 μm in cross-sections at positions P1, P2 and P3 respectively, the positions P1, P2 and P3 being positions of (1/10)L, (1/2)L, and (9/10)L from one end to another end of the elastic layer in the longitudinal direction of the elastic layer, where L is a length of the elastic layer in the longitudinal direction of the elastic layer, and wherein the elastic layer further contains a cured product of an acrylic monomer in the first region, the acrylic monomer including at least one or more of acryloyl groups and methacryloyl groups.

13. An electrophotographic image forming apparatus comprising:

at least an image-bearing member;

a charging device;

a developing device; and a transferring device configured to transfer a formed image onto recording paper, the developing device including a developing roller, wherein the developing roller includes an electroconductive substrate and an electroconductive elastic layer constituted by a single layer on an outer periphery of the substrate, the elastic layer contains a diene-based rubber, and has a thickness of 0.30 mm or snore, and the elastic layer has a crown shape in which an outer diameter of a center portion in a longitudinal direction along an axis of the substrate is larger than an outer diameter of each of both end portions in the longitudinal direction, wherein E11, the E12, and the E13 are each 500 MPa or more, where E1, E2 and E3 are elastic moduli in a first region from an outer surface of the elastic layer to a depth of 0.1 μm in cross-sections at positions P1, P2 and P3 respectively, the positions P1 P2 and P3 being positions of (1/10)L, (1/2)L, and (9/10)L from one end to another end of the elastic layer in the longitudinal direction of the elastic layer, where L is a length of the elastic layer in the longitudinal direction of the elastic layer and wherein the elastic layer further contains a cured product of an acrylic monomer in the first region, the acrylic monomer including at least one or more of acryloyl groups and methacryloyl groups.

* * * * *